US008521308B2

(12) United States Patent
Ozawa

(10) Patent No.: US 8,521,308 B2
(45) Date of Patent: Aug. 27, 2013

(54) SYSTEM, METHOD AND PROGRAM FOR SUPERVISORY CONTROL

(75) Inventor: Kimio Ozawa, Tokyo (JP)

(73) Assignee: NEC Corporation, Tokyo (JP)

(*) Notice: Subject to any disclaimer, the term of this patent is extended or adjusted under 35 U.S.C. 154(b) by 927 days.

(21) Appl. No.: 12/628,357

(22) Filed: Dec. 1, 2009

(65) Prior Publication Data

US 2010/0148917 A1 Jun. 17, 2010

(30) Foreign Application Priority Data

Dec. 16, 2008 (JP) ................................ 2008-319672

(51) Int. Cl.
*G05B 15/02* (2006.01)
*G05B 19/18* (2006.01)
*G05B 19/04* (2006.01)
*G05B 21/00* (2006.01)
*G06F 19/00* (2006.01)
*G06F 7/00* (2006.01)

(52) U.S. Cl.
USPC ........ 700/9; 700/3; 700/19; 700/65; 700/169; 700/247; 700/250; 700/268; 707/640; 707/641; 707/644; 707/645; 707/646; 707/647; 707/648; 707/649; 707/650; 707/651; 707/652; 707/653

(58) Field of Classification Search
USPC ............. 700/3, 9, 19, 65, 169, 247, 250, 268; 707/640, 641, 644–653
See application file for complete search history.

(56) References Cited

U.S. PATENT DOCUMENTS

| 5,613,119 | A | * | 3/1997 | France et al. | 713/1 |
| 5,835,911 | A | * | 11/1998 | Nakagawa et al. | 1/1 |
| 5,999,989 | A | * | 12/1999 | Patel | 710/1 |
| 6,009,524 | A | * | 12/1999 | Olarig et al. | 726/10 |
| 6,477,434 | B1 | * | 11/2002 | Wewalaarachchi et al. | 700/83 |
| 6,658,578 | B1 | * | 12/2003 | Laurenti et al. | 713/324 |
| 7,624,393 | B2 | * | 11/2009 | Egan et al. | 717/173 |
| 2002/0046266 | A1 | * | 4/2002 | Muralidhar et al. | 709/220 |
| 2003/0078959 | A1 | * | 4/2003 | Yeung et al. | 709/201 |
| 2004/0098314 | A1 | * | 5/2004 | Cool | 705/26 |
| 2005/0066019 | A1 | * | 3/2005 | Egan et al. | 709/223 |
| 2008/0307272 | A1 | * | 12/2008 | Ozawa | 714/48 |

FOREIGN PATENT DOCUMENTS

JP 6-35868 A 2/1994

* cited by examiner

*Primary Examiner* — Kavita Padmanabhan
*Assistant Examiner* — Thomas Stevens

(57) ABSTRACT

A supervisory control system includes a supervisory control target device and a supervisory control device. The supervisory control device is configured such that an attribute usage flag that indicates whether the supervisory control device supports any changes in the attributes due to adding of a function, and an attribute effectiveness flag which indicates whether the supervisory control target device supports the changes, are added, as information concerning the attributes that undergo the changes, to a definition of the instance which the supervisory control device retains. Further, the supervisory control device includes a control unit which, on a basis of data of the attribute usage flag and attribute effectiveness flag relating to the attributes undergoing the changes due to adding of a function, determines whether the supervisory control target device supports a new function or whether supervisory control based upon the new function is effective.

19 Claims, 14 Drawing Sheets

FIG. 9

| ATTRIBUTE USAGE FLAG | ATTRIBUTE EFFECTIVENESS FLAG | WHETHER THE CORRESPONDING FUNCTION OF THE SUPERVISORY CONTROL TARGET DEVICE IS TO BE USED |
|---|---|---|
| ○ | ○ | USED (SUBJECTING THE ATTRIBUTE TO SUPERVISORY CONTROL) |
| ○ | × | NOT USED (EXTRACTING THE ATTRIBUTE FROM SUPERVISORY CONTROL) |
| × | ○ | NOT USED (EXTRACTING THE ATTRIBUTE FROM SUPERVISORY CONTROL) |
| × | × | NOT USED (EXTRACTING THE ATTRIBUTE FROM SUPERVISORY CONTROL) |

SYSTEM, METHOD AND PROGRAM FOR SUPERVISORY CONTROL

This application is based upon and claims the benefit of priority from Japanese patent application No. 2008-319672, filed on Dec. 16, 2008, the disclosure of which is incorporated herein in its entirety by reference.

TECHNICAL FIELD

The present invention relates to a supervisory control system including a supervisory control device and a device to be subjected to supervisory control, this control target device being assigned an added function. The invention also relates to a method and program adapted for supervisory control in a system or device containing any functional differences caused by existence of added functions.

BACKGROUND ART

In a trunk transmission apparatus with devices each including a plurality of packages for transmitting main signals, functions are added to each of the main-signal packages over an extended apparatus maintenance period of 10 years or more to make the apparatus responsive to any changes in user request, to new requests, and/or to the progress of technology, during that period.

In consideration of the development scale of the software installed on an upper-level supervisory system inclusive of user terminals, in a supervisory control package, and in each main-signal package, generating a new instance for the software to manage the main-signal package, during the addition of the above functions, is undesirable if the instance only differs slightly from an existing instance.

Accordingly, the functions need to be added in association with the existing instance, and the addition itself causes another problem in that software with the added functions, and software without any added functions will be operated in mixed form. For example, whereas the supervisory control package will have functional additions to respond to the main-signal packages to which the functions have been added, the apparatus will include two kinds of main-signal packages and related software in mixed form. That is to say, some main-signal packages and related software will have added functions and some will not. In such a case, there will be a risk in that the software in the supervisory control package may conduct undue monitoring or control upon the main-signal packages for which the added functions are not supported.

A method of managing data in a distributed computer system is described in Patent Document 1 (Japanese Patent Application Publication JP-06035868-A) as an example of a technique relating to resolving a mismatch due to the presence/absence of added functions between a supervisory control package and a package to be subjected to supervisory control. In the data management method of Patent Document 1, data is deleted or added by defining activity/inactivity as an attribute in the data stored into each computer, and then assigning attribute modification information, so as to achieve reliable and easy data management.

SUMMARY

An exemplary object of the present invention is to provide a system, method, and program adapted for supervisory control in an apparatus which conducts supervisory control with a master-slave relationship, as between a supervisory control device and a device to be subjected to the supervisory control; wherein, when functions are added, any changes made to an instance for recognizing the kind and details of supervisory control that software of the supervisory control device possesses to monitor and control the supervisory control target device are minimized and simultaneously the supervisory control can be conducted safely, even in case of mismatching in composition of the added functions between the supervisory control device and the supervisory control target device.

In an exemplary aspect of the present invention, a supervisory control system comprises a supervisory control target device for which attributes to be subjected to supervisory control are defined in association with an existing function of the supervisory control target device; and a supervisory control device by which the attributes of the supervisory control target device that are to be subjected to supervisory control are retained as attributes of an instance associated with the supervisory control target device; wherein: the supervisory control device is configured such that when a function is added to the supervisory control target device, an attribute usage flag that indicates whether the supervisory control device supports any changes in the attributes due to the addition of the function, and an attribute effectiveness flag which, as information to which is assigned a value read out from the supervisory control target device, indicates whether the supervisory control target device supports the changes, are added, as information concerning the attributes that undergo the changes, to a definition of the instance which the supervisory control device retains; and the supervisory control device includes a control unit which, on the basis of data of the attribute usage flag and attribute effectiveness flag relating to the attributes undergoing the changes due to the addition of the function, determines at least one of whether the supervisory control target device supports the new function and whether supervisory control based upon the new function is effective for the attributes undergoing the changes due to the addition of the function.

In another exemplary aspect of the present invention, a supervisory control system comprises a supervisory control target device configured such that when a function is added, an attribute usage flag which, as information assigned by the supervisory control device, indicates whether the supervisory control device supports any changes in the attributes due to the addition of the function, and an attribute effectiveness flag that indicates whether the supervisory control target device supports the changes, are added, as information concerning the attributes that undergo the changes, to a definition of attribute information in the supervisory control target device; and the supervisory control target device includes a control unit which, on the basis of data of the attribute usage flag and attribute effectiveness flag relating to the attributes that undergo the changes due to the addition of the function, determines at least one of whether the supervisory control device supports the new function and whether supervisory control based upon the new function is effective for the attributes undergoing the changes due to the addition of the function.

In yet another exemplary aspect of the present invention, a supervisory control system comprises a supervisory control device configured such that when a function is added to the supervisory control target device, an attribute usage flag that indicates whether the supervisory control device supports any changes in the attributes due to the addition of the function, and an attribute effectiveness flag which, as information to which is assigned a value read out from the supervisory control target device, indicates whether the supervisory control target device supports the changes, are added, as information concerning the attributes that undergo the changes, to a definition of the instance which the supervisory control device retains; the supervisory control device includes a control unit which, on the basis of data of the attribute usage flag and attribute effectiveness flag relating to the attributes undergoing the changes due to the addition of the function, determines at least one of whether the supervisory control target device supports the new function and whether supervisory control based upon the new function is effective for the attributes undergoing the changes due to the addition of the function; the supervisory control target device is configured such that when a function is added, an attribute usage flag which, as information assigned by the supervisory control device, indicates whether the supervisory control device supports any changes in the attributes due to the addition of the function, and an attribute effectiveness flag that indicates whether the supervisory control target device supports the changes, are added, as information concerning the attributes that undergo the changes, to a definition of attribute information in the supervisory control target device; and the supervisory control target device includes a control unit which, on the basis of data of the attribute usage flag and attribute effectiveness flag relating to the attributes that undergo the changes due to the addition of the function, determines at least one of whether the supervisory control device supports the new function and whether supervisory control based upon the new function is effective for the attributes undergoing the changes due to the addition of the function.

In a supervisory control method according to a further exemplary aspect of the present invention, a supervisory control device retaining the supervisory control target attributes which is defined in association with an existing function of the supervisory control target device as attributes of an instance associated with the supervisory control target device is configured such that when a function is added to the supervisory control target device, an attribute usage flag that indicates whether the supervisory control device supports any changes in the attributes due to the addition of the function, and an attribute effectiveness flag that, as information to which is assigned a value read out from the supervisory control target device, indicates whether the supervisory control target device supports the changes, are added, as information relating to the attributes that undergo the changes, to a definition of the instance in the supervisory control device; and on the basis of the attribute usage flag and attribute effectiveness flag data relating to the attributes that undergo the changes due to the addition of the function, the supervisory control device determines at least one of whether the supervisory control target device supports the new function and whether supervisory control based upon the new function is effective for the attributes undergoing the changes due to the addition of the function.

In a supervisory control method according to a further exemplary aspect of the present invention, a supervisory control target device for which attributes to be subjected to supervisory control are defined in association with an existing function of the supervisory control target device is configured such that when a function is added, an attribute usage flag which, as information assigned by the supervisory control device, indicates whether the supervisory control device supports any changes in the attributes due to the addition of the function, and an attribute effectiveness flag that indicates whether the supervisory control target device supports the changes, are added, as information concerning the attributes that undergo the changes, to a definition of attribute information in the supervisory control target device; and on the basis of data of the attribute usage flag and attribute effectiveness flag relating to the attributes that undergo the changes due to the addition of the function, the supervisory control target device determines at least one of whether the supervisory control device supports the new function and whether supervisory control based upon the new function is effective for the attributes undergoing the changes due to the addition of the function.

In a further exemplary aspect of the present invention, there is provided a program for supervisory control conducted between a supervisory control target device for which attributes to be subjected to supervisory control are defined in association with an existing function of the supervisory control target device, and a supervisory control device retaining the supervisory control target attributes of the supervisory control target device as attributes of an instance associated with the supervisory control target device, wherein: in accordance with the supervisory control program applied to the supervisory control device, a computer in which, when a function is added to the supervisory control target device, an attribute usage flag that indicates whether the supervisory control device supports any changes in the attributes due to addition of a function, and an attribute effectiveness flag that, as information to which is assigned a value read out from the supervisory control target device, indicates whether the supervisory control target device supports the changes are added, as information relating to the attributes that undergo the changes, to a definition of the instance, executes the process of checking the attribute usage flag and attribute effectiveness flag data concerning the attributes that undergo the changes due to the addition of the function, and then determining at least one of whether the supervisory control target device supports the new function and whether supervisory control based upon the new function is effective for the attributes undergoing the changes due to the addition of the function.

In a further exemplary aspect of the present invention, there is provided a program for supervisory control conducted between a supervisory control target device for which attributes to be subjected to supervisory control are defined in association with an existing function of the supervisory control target device, and a supervisory control device retaining the supervisory control target attributes of the supervisory control target device as attributes of an instance associated with the supervisory control target device, wherein: in accordance with the supervisory control program applied to the supervisory control target device, a computer in which, when a function is added, an attribute usage flag that, as information assigned by the supervisory control device, indicates whether the supervisory control device supports any changes in the attributes due to addition of a function, and an attribute effectiveness flag that indicates whether the supervisory control target device supports the changes are added, as information relating to the attributes that undergo the changes, to a definition of the information concerning the attributes, executes the process of checking the attribute usage flag and attribute effectiveness flag data concerning the attributes that undergo the changes due to the addition of the function, and then determining at least one of whether the supervisory control device supports the new function and whether supervisory control based upon the new function is effective for the attributes undergoing the changes due to the addition of the function.

BRIEF DESCRIPTION OF DRAWINGS

FIG. 9 is an explanatory diagram that represents association between attribute usage flag and attribute effectiveness flag states and existence of a subject of supervisory control;

DESCRIPTION OF EMBODIMENT

Hereunder, an exemplary embodiment of the present invention will be described referring to the accompanying drawings. In the present invention, an apparatus in which packages to be subjected to supervisory control are configured with a supervisory control package to form one integrated unit is called a rack-configured apparatus, as with the trunk transmission apparatus described earlier herein.

Figure 1:
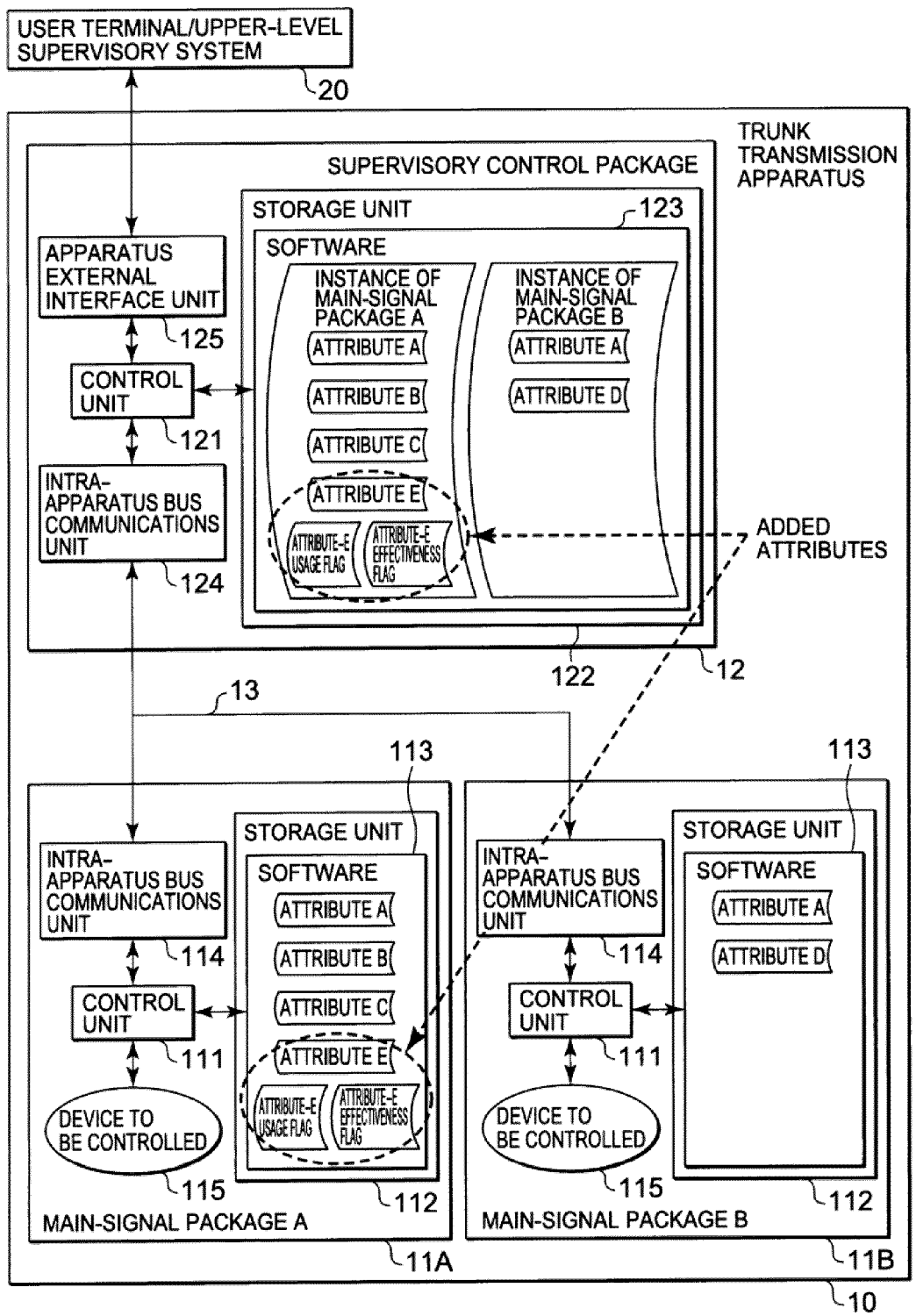
FIG. 1 is an explanatory diagram showing an example of a software configuration in a trunk transmission apparatus as a configurational example of a rack-configured apparatus according to the present invention.

FIG. 1 is an explanatory diagram showing an example of a trunk transmission apparatus configuration as a configurational example of a rack-configured apparatus according to the present invention. The trunk transmission apparatus 1 shown in FIG. 1 includes a plurality of main-signal packages 11 (in the present example, packages 11A and 11B) that each transmit main signals, and a supervisory control package 12 that monitors each main-signal package 11. Each main-signal package 11 and the supervisory control package 12 are interconnected via a communications bus 13 through which various information is transmitted inside the apparatus. A master-slave relationship on supervisory control exists between the supervisory control package 12 and the main-signal package 11 to be subjected to supervisory control (herein, referred to as the supervisory control target package where necessary).

The main-signal package 11 that executes a substantial process for transmitting the main signals is, for example, a device or control circuit board constituted as one mounting unit in the trunk transmission apparatus. This package includes a control unit 111, a storage unit 112, an intra-apparatus bus communications unit 114, and a device 115 to be subjected to supervisory control (herein, referred to as the supervisory control target device where necessary). Software 113 that is executed on the main-signal package 11 is retained in a storage region of the storage unit 112. After loading the software 113 saved in the storage unit 112, the control unit 111 controls internal operation of the apparatus in the main-signal package 11. The control unit 111 is implemented by a CPU, for example. Also, the storage unit 112 is implemented by a storage device, for example.

In the storage region of the storage unit 112, the software 113 of the main-signal package 11 retains attributes associated with assigned functions of the main-signal package 11. The attributes here refer to various information on settings, alarms, performance, and the like, of the package, the information being retained as program data in the storage region. A data type, a data range, operating parameters, and other attribute information are assigned as each of the attributes.

The number of attributes is not specifically defined. During addition of functions to the main-signal package 11, attributes associated with the addition of the functions are added to the software 113 of the main-signal package 11. In addition to the addition of the attributes, a definition of data and a process upon the data are changed so that the software 113 retains an attribute usage flag and attribute effectiveness flag relating to the added attributes. The example shown in FIG. 1 represents a case in which an attribute E is added to the main-signal package 11A.

The intra-apparatus bus communications unit 114 controls communications for data exchange between the main-signal package 11 and other packages, within the trunk transmission apparatus. In the present embodiment, in accordance with an instruction from a control unit 121, the intra-apparatus bus communications unit 114 controls the communications for command exchange between at least the supervisory control package 12 and main-signal package 11 placed in the master-slave relationship.

The control target device 115 processes the main signals in the main-signal package.

In the main-signal package 11, the control unit 111 that has loaded the software 113 stored in the storage unit 112 receives a command from the supervisory control package 12 via the intra-apparatus bus communications unit 114 and in accordance with the command, executes a monitoring/control request concerning the control target device 115. During the reception of the command, the control unit 111 not only controls the control target device 115, but also makes reference to data of the attributes retained by the software 113, or assigns data to the attributes, as required. Hereunder, when the expression that the control unit 111 has done something is used, this expression is to be taken to mean that the control unit 111 has executed that process in accordance with the software 113.

The supervisory control package 12 conducts supervisory control upon a supervisory control target package such as the main-signal package 11, and includes a control unit 121, a storage unit 122, an intra-apparatus bus communications unit 124, and an apparatus external interface unit 125. Software 123 that is executed on the supervisory control package 12 is retained in a storage region of the storage unit 122. After loading the software 123 saved in the storage unit 122, the control unit 121 controls internal operation of the apparatus in the supervisory control package 12. The control unit 121 is implemented by a CPU, for example. Also, the storage unit 122 is implemented by a storage device, for example.

The software 123 of the supervisory control package 12 retains instances each having attribute information (such as settings, alarms, and performance) on the individual main-signal packages 11 that are to be subjected to supervisory control. More specifically, the software 123 retains the instances (entities of processes or data in the program) that are defined in association with the functions assigned to each main-signal package 11 to be subjected to supervisory control. Each instance includes the attributes representing the functions of the main-signal package. The attributes here refer to various information on the settings, alarms, performance, and the like, of the package, the information being retained as program data in the storage region. A data type, a data range, operating parameters, and other attribute information are assigned as each of the attributes.

During addition of a function to the main-signal package 11, an attribute E appropriate for the new function of the main-signal package 11 is added to the software 123 of the supervisory control package 12. In addition to the addition of the attribute, a definition of the instance of the supervisory control target package is changed so that internal data of the software 123 includes an attribute usage flag and attribute effectiveness flag relating to the added attribute. Even after the change of the instance, all definitions (including a manner of allocation to the storage region) that exist before the change was conducted are maintained for the attributes associated with existing functions.

The intra-apparatus bus communications unit 124 controls communications for data exchange between the supervisory control package 12 and other packages, within the trunk transmission apparatus. In the present embodiment, in accordance with an instruction from the control unit 121, the intra-apparatus bus communications unit 124 controls the communications for command exchange between at least the supervisory control package 12 and each main-signal package 11 placed in the master-slave relationship.

The apparatus external interface unit 125 controls communications for data exchange between the supervisory control package 12 and an upper-level supervisory system 20 including a user terminal, the upper-level supervisory system 20 being external to the trunk transmission apparatus. In the example of FIG. 1, the user terminal and the upper-level supervisory system are shown as elements of the same hierarchical level. Hereunder, however, the user terminal will be simply described as the upper-level supervisory system 20, since the user terminal can also be regarded as one constituent element of the system in that both deliver instructions to the supervisory control package 12.

The upper-level supervisory system 20 connects to the trunk transmission apparatus 10 (more specifically, the supervisory control package 12) and conducts supervisory control from the outside by, for example, transmitting a supervisory control command in response to specification of the supervisory control target package or of the attributes thereof.

In the supervisory control package 12, the control unit 121 that has loaded the software 123 stored in the storage unit 122 receives the command from the supervisory system 20 via the apparatus external interface unit 125. The control unit 121 then interprets the received command and processes the external supervisory control request. During the reception of the command, the control unit 121 judges the command for effectiveness by cross-checking the various definitions relating to the attributes contained in the instance associated with the supervisory control target package specified in the command, against the kind and details of supervisory control specified in the command. After the cross-checks, the control unit 121 transmits a supervisory control command as an intra-apparatus command to the specified package as required, and depending upon details of a response, makes reference to data of the attributes retained as part of the instance by the software 123, or assigns data to the attributes. For example, in the control unit 121, the type and details of control of the package requested by the supervisory control command are compared with the attribute information (data type, data range, and operating parameters) of the attributes contained in the associated instance. If the type and details of control stay within an allowable range, the control unit 121 judges the command to be effective, and may execute monitoring/control upon the associated main-signal package 11. Hereunder, when the expression that the control unit 121 has done something is used, this expression is to be taken to mean that the control unit 121 has executed that process in accordance with the software 123.

Basically, between the supervisory control package and supervisory control target package placed in the master-slave relationship, the attribute values retained by the supervisory control target package are set to the attribute values contained in the instance of the supervisory control target package that is retained in the supervisory control package 12.

However, the attribute usage flag and attribute effectiveness flag that have been added during the addition of functions are handled as follows:

The attribute usage flag is information that indicates whether the supervisory control package 12 supports the function associated with the corresponding attributes of the supervisory control target package (in the present example, the main-signal package 11A) to which the function has been added. The attribute usage flag takes a value indicative of "Used" or "Not used". The present example assumes that the software 123 of the supervisory control package 12 has a right to determine which of the two values is to be assigned. A value specified from the supervisory control package 12 is therefore assigned to the attribute usage flag retained in the main-signal package 11. During the addition of functions, when a value of the attribute-E usage flag is defined, a definite value (for example, if the value is zero-cleared, then zero) that is read out from at least an unused region of the storage unit of each package is set as "Not used", and other data is set as "Used".

The attribute effectiveness flag is information that indicates whether the supervisory control target package (in the present example, the main-signal package 11A) to which the function has been added supports the function associated with the corresponding attributes. The attribute effectiveness flag takes a value indicative of "Effective" or "Ineffective". The present example assumes that the software 113 of the main-signal package 11A to which the function has been added has a right to determine which of the two values is to be assigned. A value that has been read out from the associated supervisory control target package is therefore assigned to the attribute effectiveness flag retained in the supervisory control package 12. During the addition of functions, when the value of the attribute-E effectiveness flag is defined, a definite value (for example, if the value is zero-cleared, then zero) that is read out from at least the unused region of the storage unit of each package is set as "Ineffective", and other data is set as "Effective".

Figure 2:
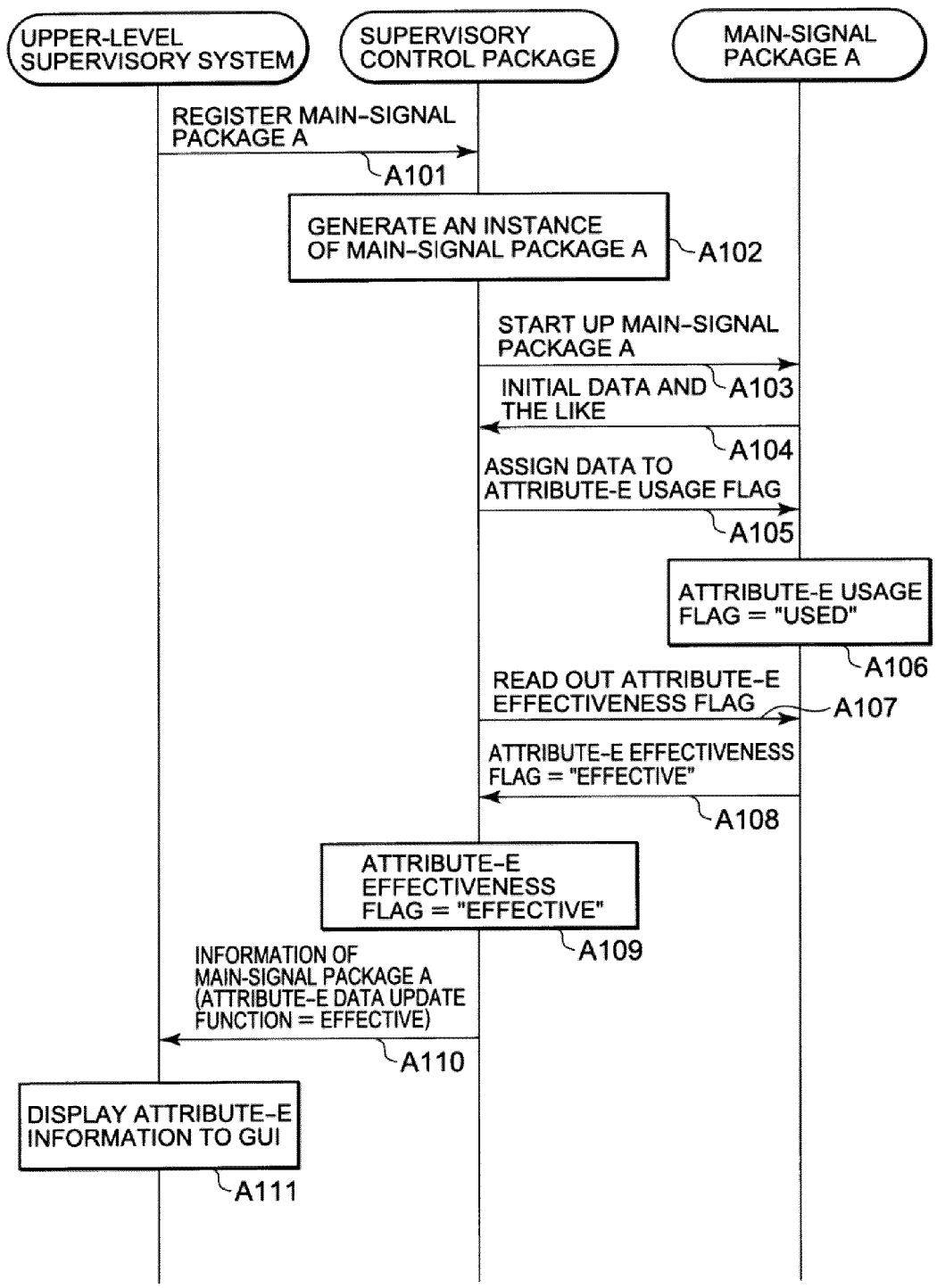
FIG. 2 is a flowchart that shows one example of operation of the trunk transmission apparatus shown in FIG. 1.

Next, operation of the present embodiment is described below. FIG. 2 is a flowchart that shows one example of operation of the trunk transmission apparatus according to the embodiment. The example shown in FIG. 2 applies to the operation occurring when the supervisory control package 12 and the main-signal package 11A are both associated with the new function (the added attribute E of the main-signal package 11A). The software configuration of the trunk transmission apparatus in the present example is as shown in FIG. 1.

In the present example, the instance associated with the main-signal package 11A is retained in the supervisory control package 12 by the software 123 thereof, and the attribute E is present in the instance. An attribute-E usage flag and an attribute-E effectiveness flag also exist for the attribute E. The attribute E is a new attribute that is subjected to supervisory control coupled with the addition of the function to the main-signal package 11A, and the present example assumes that the attribute is a setup parameter.

In addition, the attribute E upon which the software 113 of the main-signal package 11A can conduct supervisory control is present in the main-signal package 11A. An attribute-E usage flag and an attribute-E effectiveness flag further exist for the attribute E. The present example assumes that the attribute E is associated with an added setup item relating to the control target device 115.

As shown in FIG. 2, in order to subject the main-signal package 11A to supervisory control in response to, for example, the command from the upper-level supervisory system 20, the control unit 121 of the supervisory control package 12 first generates the instance associated with the main-signal package 11A, as an object with concretized data. Steps A101 and A102 in FIG. 2 concern the generation of the instance. At this time, attribute data present on the instance is determined using the command received from the upper-level supervisory system 20, and the information read out from the associated main-signal package 11A. For example, the control unit 121 of the supervisory control package 12 may read out initial data by exchanging an initializing command for starting the main-signal package 11A, as in the example of FIG. 2. Steps A103 and A104 in FIG. 2 concern the readout of the initial data.

In the main-signal package 11A, the control unit 111, during its initialization, sets initial data for each attribute retained in the main-signal package 11A, in accordance with the software 113 mounted therein. In the present example, during the setting of the initial data, the control unit 111 assigns the value indicative of "Effective" to the attribute-E effectiveness flag. This is due to the fact that the software 113 has an added function.

When the control unit 121 of the supervisory control package 12 generates the instance of the main-signal package 11A, the control unit 121 assigns the value indicative of "Used" to the attribute-E usage flag of the main-signal package 11A. The control unit 121 of the supervisory control package 12 transmits a control command to the main-signal package 11A, for example, via the intra-apparatus bus communications unit 124, to request data assignment to the attribute-E usage flag (step A105).

Upon receipt of the control command by the main-signal package 11A, the control unit 111 assigns, in step A106, the value indicative of "Used" to the attribute-E usage flag retained in the main-signal package 11A, in accordance with the control command. If the attribute-E usage flag retained in the main-signal package 11A has the value indicative of "Used" and the attribute-E effectiveness flag has the value indicative of "Effective"; the control unit 111 judges the data written for the attribute E to be effective data, and activates the added function on the basis of the assigned data of the attribute E. If the two flags have data other than the above, even when the control unit 111 itself supports the added function, the control unit 111 will regard the data written for the attribute E, as ineffective, and activate or deactivate the added function on the basis of a fail-safe function.

When the control unit 121 of the supervisory control package 12 generates the instance of the main-signal package 11A, the control unit 121 also reads out the value of the attribute-E effectiveness flag from the main-signal package 11A. The control unit 121 next stores the read-out value into the attribute-E effectiveness flag of the instance associated with the main-signal package 11A. The control unit 121 of the supervisory control package 12 transmits a control command to the main-signal package 11A, for example, via the intra-apparatus bus communications unit 124 to request the readout of the attribute-E effectiveness flag (step A107).

Upon receipt of the control command by the main-signal package 11A, the control unit 111 reads out the value of the attribute-E effectiveness flag retained in the main-signal package 11A, in accordance with the control command, and returns the read-out value (in the present example, the value indicative of "Effective") to the supervisory control package 12 (step A108).

Upon receiving a response from the main-signal package 11A, the control unit 121 of the supervisory control package 12 updates the value of the attribute-E effectiveness flag corresponding to the instance of the supervisory control package 12 (step A109). This update subsequently makes it possible to detect the fact that the main-signal package 11A mounted in the apparatus has the new function associated with the attribute E, and recognize the fact that the new function can be monitored and controlled. For example, when the control unit 121 of the supervisory control package 12 transmits information relating to the main-signal package 11A, the control unit 121 notifies to the upper-level supervisory system 20 that the data update function for the attribute E, a setup parameter associated with the new function of the main-signal package 11A, is effective, and may display this information to a user interface (steps A110 and A111).

As described above, in the present example, when it is judged from the instance of the supervisory control target package with an added function which is retained in the supervisory control package 12 that the attribute-E usage flag has the value indicative of "Used" and that the attribute-E effectiveness flag has the value indicative of "Effective", the effectiveness of the monitoring or control of the attribute E can be discriminated. This, in turn, makes it possible to identify from the supervisory control package whether the main-signal package supports the added attribute, and to provide a function which, if the main-signal package does not support the added attribute, inhibits unauthorized access to the particular main-signal package or detects and warns about the unauthorized access.

Figure 3:
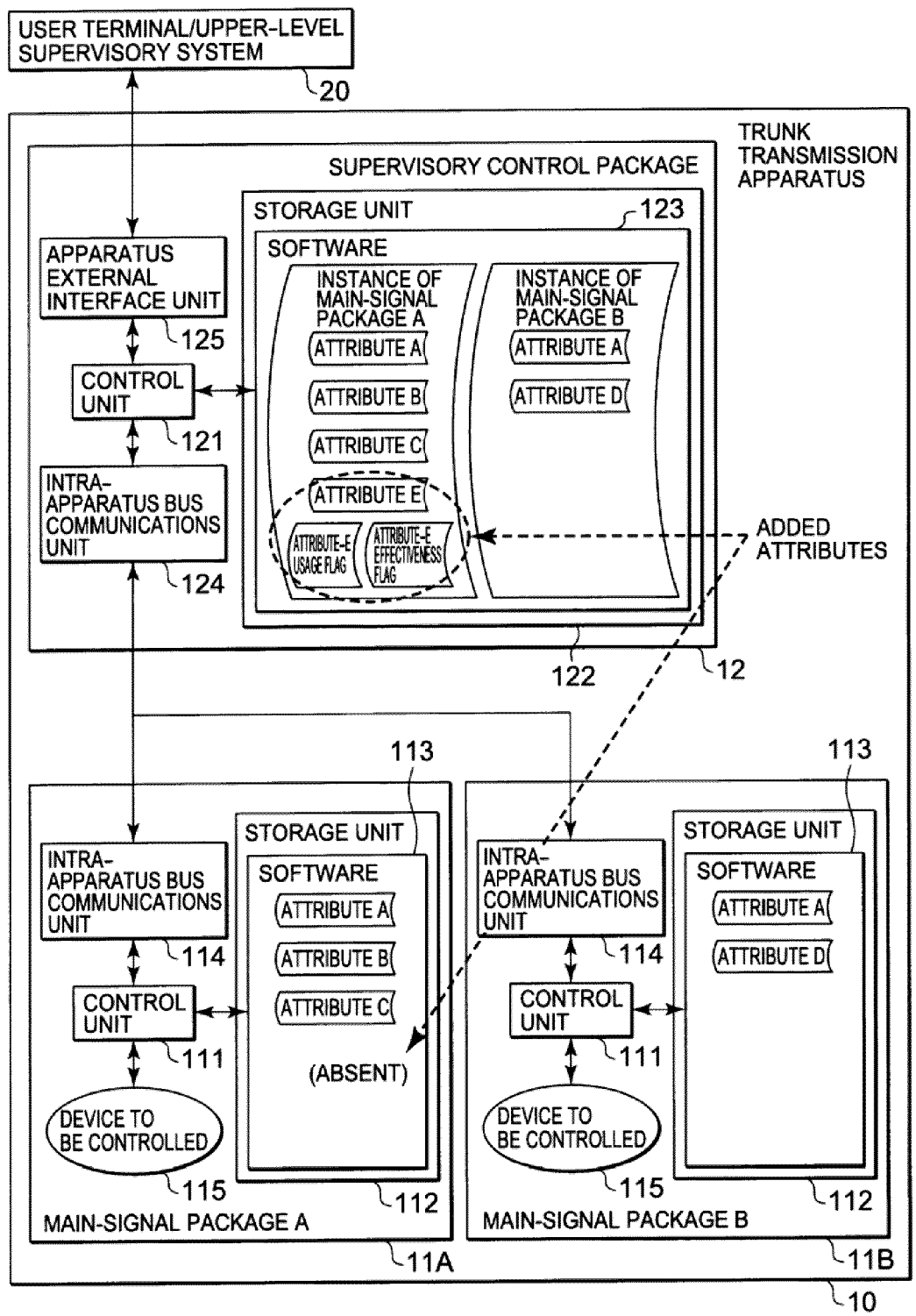
FIG. 3 is an explanatory diagram showing a software configuration of a trunk transmission apparatus in a first example.

Next, operation of the apparatus in a case (first example) that while the supervisory control package 12 supports a new function (an added attribute E of the main-signal package 11A), the main-signal package 11A subjected to supervisory control does not support the new function, is described below referring to FIGS. 3 and 4. FIG. 3 is an explanatory diagram showing a software configuration of the trunk transmission apparatus in the first example. Also, FIG. 4 is a flowchart that shows the operation of the trunk transmission apparatus in the first example.

In the present example, the instance associated with the main-signal package 11A is retained in the supervisory control package 12 by the software 123 thereof, and the attribute E is present in the instance. An attribute-E usage flag and an attribute-E effectiveness flag also exist for the attribute E. The attribute E is a new attribute that is subjected to supervisory control coupled with the addition of the function to the main-signal package 11A, and the present example assumes that the attribute is a setup parameter.

The attribute E upon which the software 113 of the main-signal package 11A can conduct supervisory control, however, does not exist in the main-signal package 11A. Naturally, flags relating to the attribute E (i.e., the attribute-E usage flag and the attribute-E effectiveness flag) do not exist in the software 113 of the main-signal package 11A, either.

Figure 4:
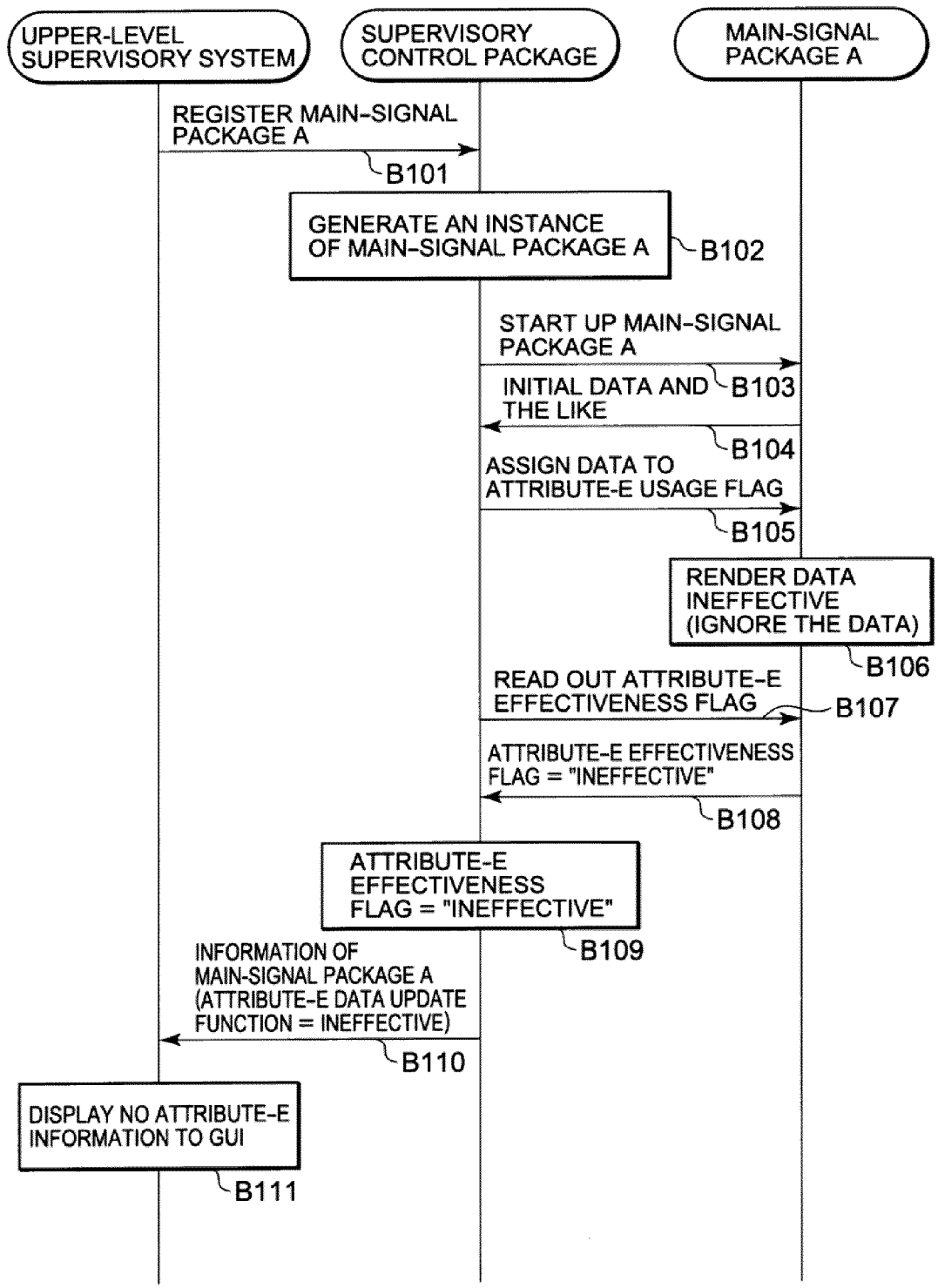
FIG. 4 is a flowchart that shows operation of the trunk transmission apparatus in the first example.

Description of steps B101 to B105 shown in FIG. 4 is omitted since these steps are substantially the same as steps A101 to A105 shown in FIG. 2.

After the control unit 121 of the supervisory control package 12 has transmitted a control command to the main-signal package 11A via the intra-apparatus bus communications unit 124 to request data assignment to the attribute-E usage flag (step B105), since a definition concerning the attribute E associated with the new function is not introduced in the main-signal package 11A, the control unit 111 of the main-signal package 11A ignores the particular value and handles the value as ineffective (step B106). That is to say, unless a command error based upon interpretation of the command is recognized, a value that indicates "Used" is set in the unused region of the storage unit 112 of the main-signal package 11A, and this value is ignored as an ineffective value.

When the control unit 121 of the supervisory control package 12 generates the instance of the main-signal package 11A, the control unit 121 also reads out the value of the attribute-E effectiveness flag from the main-signal package 11A. The control unit 121 next stores the read-out value into the attribute-E effectiveness flag of the instance associated with the main-signal package 11A. The control unit 121 of the supervisory control package 12 transmits a control command to the main-signal package 11A, for example, via the intra-apparatus bus communications unit 124 to request the readout of the attribute-E effectiveness flag (step B107).

In the main-signal package 11A, the control unit 111, during its initialization, sets initial data for each attribute retained in the main-signal package 11A, in accordance with the software 113 installed thereupon. At this time, the software 113 of the main-signal package 11A in the present example does not support the new function. For this reason, a default value (in the attribute effectiveness flag, "Ineffective") that is read out from the unused region is set in a storage region to which the value of the attribute-E effectiveness flag will be assigned if the new function is supported.

Upon receipt of the attribute-E effectiveness flag readout control command by the main-signal package 11A, unless a command error based upon interpretation of the command is recognized, the control unit 111 reads out the value from the unused region of the storage unit 112 of the main-signal package 11A, and returns the read-out value (in the present example, the value indicative of "Ineffective") in step B108.

Upon receiving a response from the main-signal package 11A, the control unit 121 of the supervisory control package 12 updates the value of the attribute-E effectiveness flag corresponding to the instance of the supervisory control package 12 (step B109). This update subsequently makes it possible to detect the fact that the main-signal package 11A mounted in the apparatus does not have the new function associated with the attribute E, and recognize the fact that the new function cannot be monitored or controlled. For example, when the control unit 121 of the supervisory control package 12 transmits information relating to the main-signal package 11A to the upper-level supervisory system 20, the control unit 121 notifies to the system 20 that the data update function for the attribute E, a setup parameter associated with the new function of the main-signal package 11A, is ineffective (i.e., not provided in the supervisory control target package), and may display an error to the user interface (steps B110 and B111).

In another mounting scheme of the upper-level supervisory system, the data update function for the attribute E may not be hidden, concealed, or obscured, even if the value of the attribute-E effectiveness flag is "Ineffective". In that case, the user is likely to change the data settings of the attribute E. If this change actually takes place, the control unit 121 of the supervisory control package 12 may report an alarm to the upper-level supervisory system 20, provided that the value of the attribute-E effectiveness flag is "Ineffective" in the instance retained in the corresponding package, and that the attribute E is accessed.

As described above, in the present example, in the instance of the supervisory control target package with an added function which is retained in the supervisory control package 12, the attribute-E usage flag has the value indicative of "Used" in the instance of the supervisory control target package with an added function, and the attribute-E effectiveness flag has the value indicative of "ineffective", so the ineffectiveness of the monitoring or control of the attribute E (i.e., absence of the function) can be discriminated.

Figure 5:
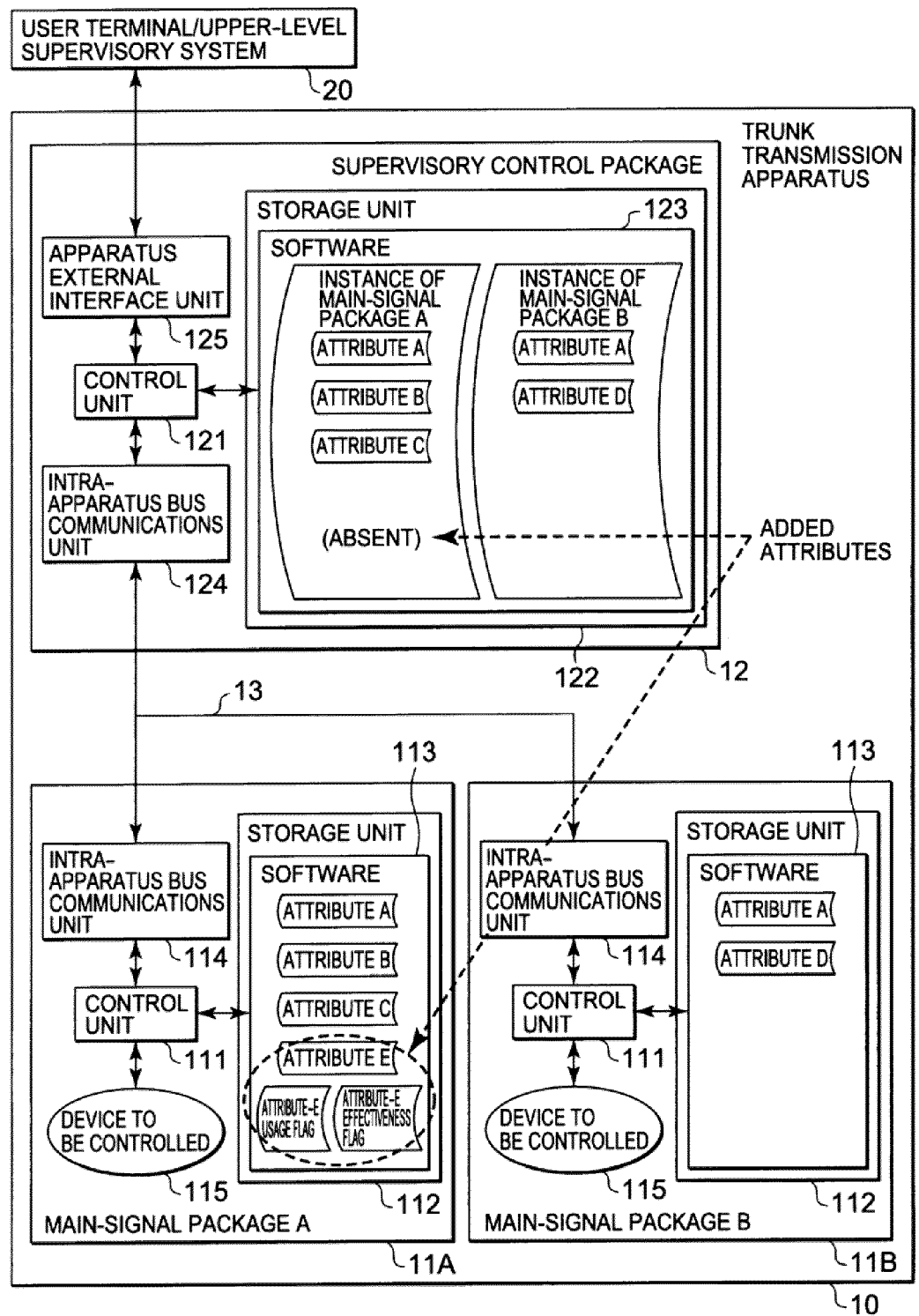
FIG. 5 is an explanatory diagram showing another software configuration of a trunk transmission apparatus in a second example.

Next, operation of the apparatus in a case (second example) that while the main-signal package 11A supports a new function (an added attribute E), the supervisory control package 12 that conducts supervisory control does not support the new function, is described below referring to FIGS. 5 and 6. FIG. 5 is an explanatory diagram showing a software configuration of the trunk transmission apparatus in the second example. Also, FIG. 6 is a flowchart that shows the operation of the trunk transmission apparatus in the second example.

In the present example, the attribute E upon which the software 113 of the main-signal package 11A can conduct supervisory control is present in the main-signal package 11A. An attribute-E usage flag and an attribute-E effectiveness flag further exist for the attribute E. The present example assumes that the attribute E is associated with an added setup item relating to the control target device 115.

However, the instance associated with the main-signal package 11A is retained in the supervisory control package 12 by the software 123 thereof, but the attribute E is absence in the instance. An attribute-E usage flag and an attribute-E effectiveness flag do not exist for the attribute E, either.

Figure 6:
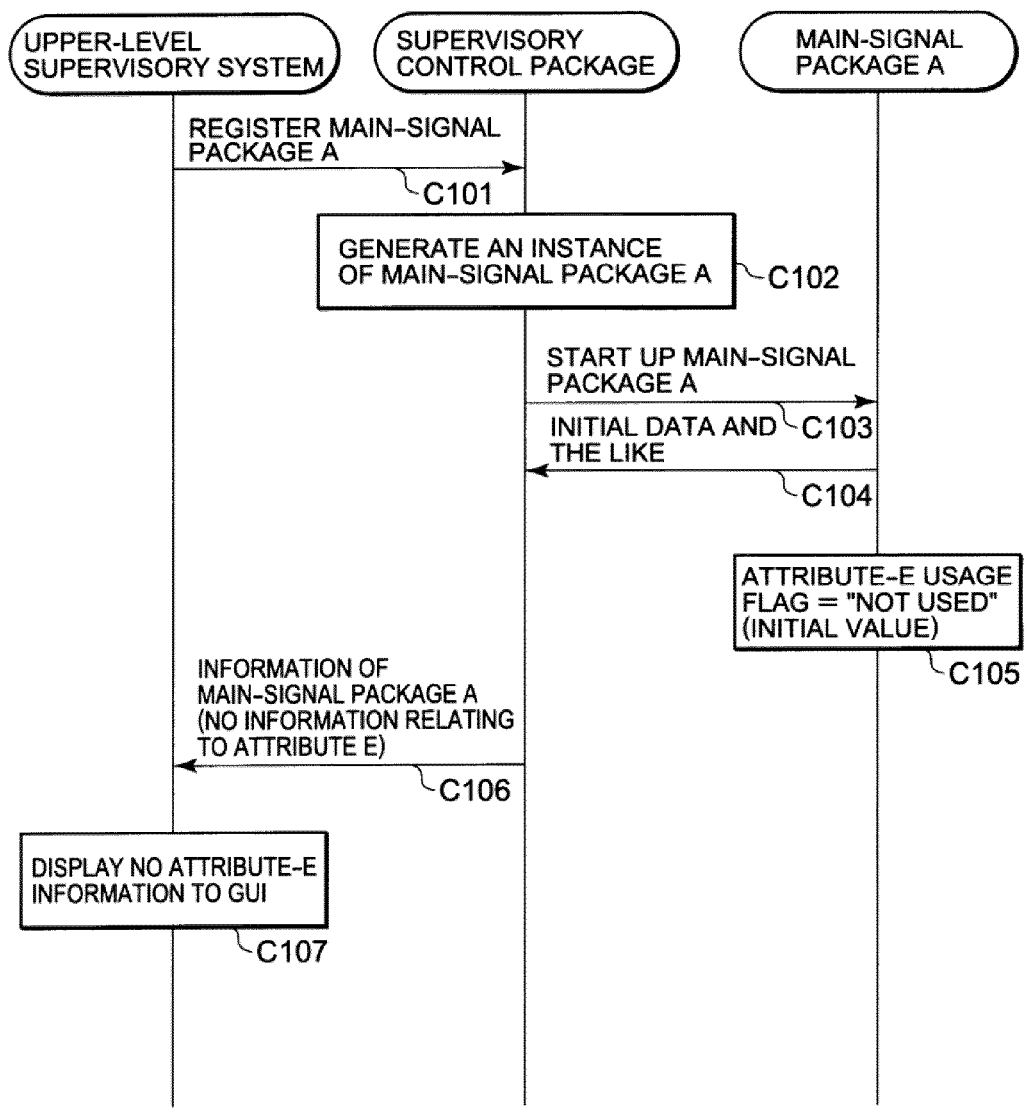
FIG. 6 is a flowchart that shows operation of the trunk transmission apparatus in the second example.

As shown in FIG. 6, in order to subject the main-signal package 11A to supervisory control in response to, for example, the command from the upper-level supervisory system 20, the control unit 121 of the supervisory control package 12 first generates the instance associated with the main-signal package 11A, as an object with concretized data. Steps C101 and C102 in FIG. 6 concern the generation of the instance. At this time, attribute data present on the instance is determined using the command received from the upper-level supervisory system 20, and the information read out from the associated main-signal package 11A. For example, the control unit 121 of the supervisory control package 12 may read out initial data by exchanging the initializing command for starting the main-signal package 11A. Steps C103 and C104 in FIG. 6 concern the readout of the initial data.

In the main-signal package 11A, the control unit 111, during its initialization, sets initial data for each attribute retained in the main-signal package 11A, in accordance with the software 113 installed thereupon. In the present example, during the setting of the initial data, the control unit 111 assigns the value indicative of "Effective" to the attribute-E effectiveness flag. This is due to the fact that the software 113 has an added function.

In the present example, when the control unit 121 of the supervisory control package 12 generates the instance of the main-signal package 11A, the control unit 121 does not access the attribute-E usage flag of the main-signal package 11A. This is because, since the software 123 of the supervisory control package 12 does not have the added function, the software does not recognize the attribute-E usage flag itself.

In other words, in the present example, the control command that requests the main-signal package 11A to assign data to the attribute-E usage flag is not transmitted. This control command will normally be transmitted if the software 123 of the supervisory control package 12 supports the added function. Since the control command is not transmitted, the initial value of the attribute-E usage flag retained in the main-signal package 11A remains "Unused" (step C105).

Since the attribute-E usage flag has the value indicative of "Not used" in the main-signal package 11A, the control unit ill of the main-signal package 11A activates or deactivates the new function on the basis of the fail-safe function by making ineffective the data written for the attribute E. This means that when the control command for the attribute E is received from the upper-level supervisory system 20, even if the software 123 of the supervisory control package 12 does not recognize a command error based upon interpretation of the command, the software 113 of the main-signal package 11A maintains the operation occurring before the new function is supported. Compatibility is also maintained.

In the main-signal package 11A, the control unit 111 assigns the value indicative of "Effective" to the attribute-E effectiveness flag since the new function is supported. When the control unit 121 of the supervisory control package 12 generates the instance of the main-signal package 11A, however, the control unit 121 does not read out the attribute-E effectiveness flag of the main-signal package 11A. In the upper-level supervisory system 20, when the attribute data of the main-signal package 11A is read out from the supervisory control package 12, the attribute E and the attribute-E effectiveness flag cannot be read out, so it can be judged in step C106 that the software 123 of the supervisory control package 12 mounted in the apparatus does not have the new function. When the software 123 of the supervisory control package 12 is judged not to have the new function, the upper-level supervisory system 20 may not display, to the user interface, the data update function for the attribute E which is a setup parameter of the new function (step C107).

The operation described above allows the main-signal package to identify whether the supervisory control package supports the added attribute. The above operation also allows the main-signal package to provide a function which, if the supervisory control package does not support the added attribute, inhibits unauthorized access to the particular main-signal package or detects and warns about the unauthorized access.

According to the present embodiment, therefore, during the addition of a function, the upper-level supervisory system with the added function, the supervisory control package software, and the main-signal package software can each identify whether the attributes of the instance corresponding to the added function are also added. Thus, any differences in the support states of the software functions between the supervisory control package and main-signal package mounted in the apparatus can be detected and displayed or warned about.

In addition, in a development process for obtaining such a logical mechanism, the number of man-hours required for development can be reduced because of no need to redefine the instance during the addition of the function. Furthermore, any impacts of a change of the instance upon existing definitions can be minimized.

Figure 7:
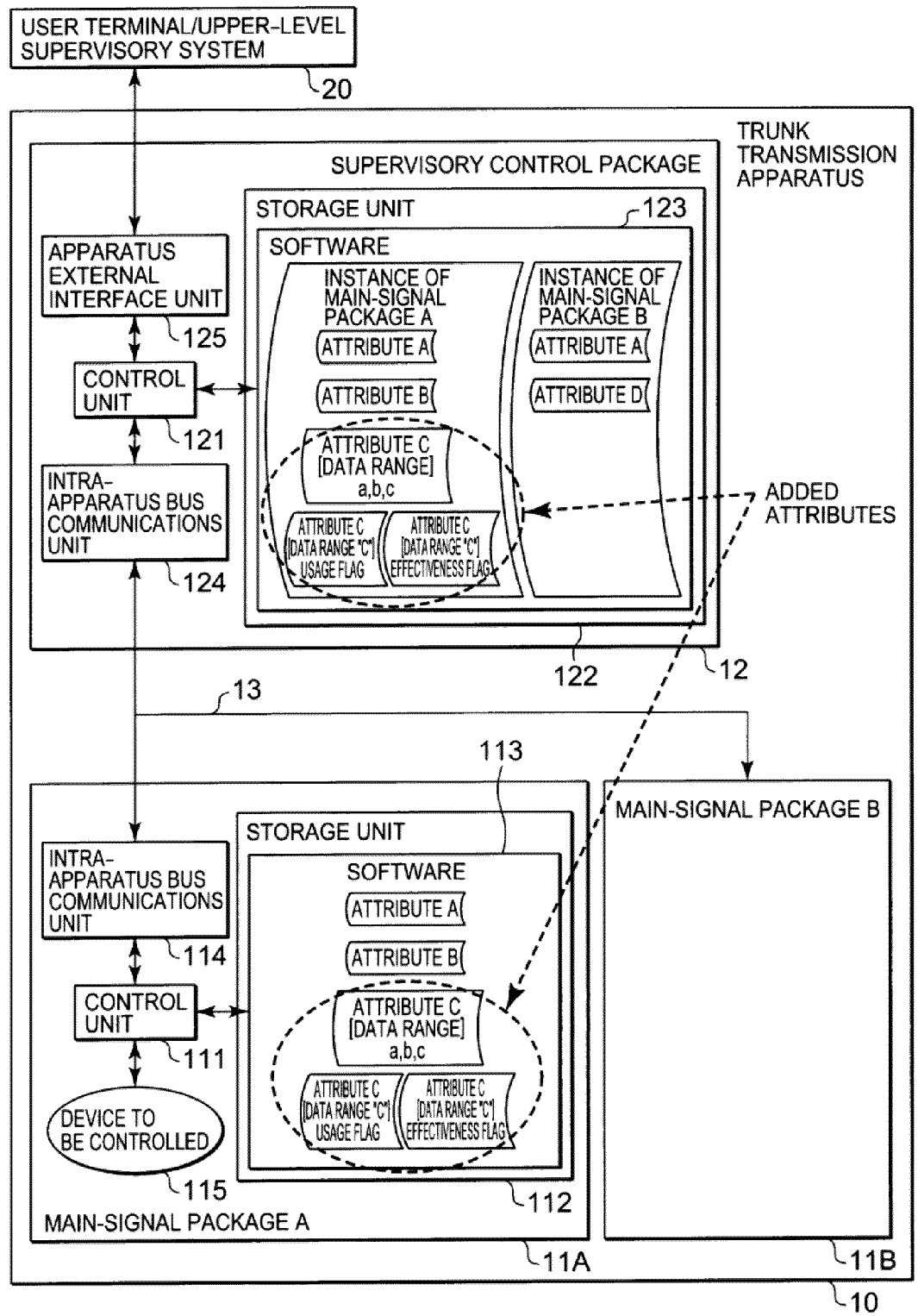
FIG. 7 is an explanatory diagram showing yet another software configuration of a trunk transmission apparatus in a third example.
Figure 8:
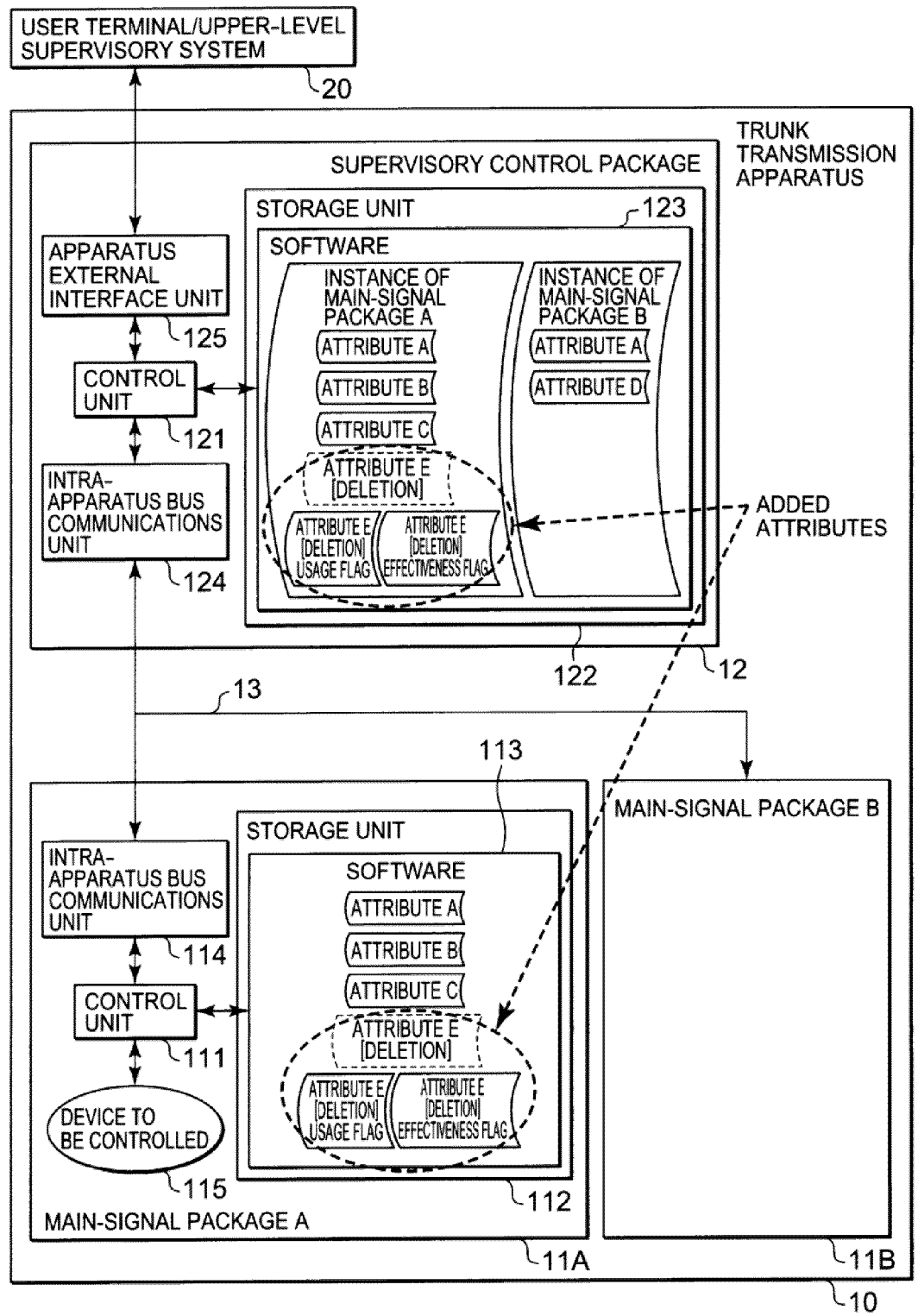
FIG. 8 is an explanatory diagram showing a further software configuration of a trunk transmission apparatus in a fourth example.

FIGS. 7 and 8 are explanatory diagrams that show other examples of association with the addition of a function. FIG. 7 shows a configuration of software in a case (third example) that a data range of an existing attribute C is extended during the addition of a function to the main-signal package 11A. To add a new data range [c] for the attribute C, it is necessary only to provide the usage flag and effectiveness flag corresponding to the data range [c]. Adopting such a configuration makes it possible to identify whether the supervisory control package and the main-signal package each support the data range [c] of the attribute C associated with the added function, and to provide the function which, if the data range [c] of the added attribute is not supported, inhibits unauthorized access to the main-signal package or detects and warns about the unauthorized access. Operation relating to the usage flag and the effectiveness flag is essentially the same as that of the attribute-E usage flag and attribute-E effectiveness flag described above.

FIG. 8 shows a configuration of software in a case (fourth example) that the existing attribute E is deleted during a change of the main-signal package 11A in function. When there is a need to delete the attribute E, assigning a usage flag and effectiveness flag relating to the deletion of the attribute E makes it possible to identify from the supervisory control package whether the main-signal package supports the deletion of the attribute E, and to provide the function which, if the deletion of the attribute E is not supported, inhibits unauthorized access (assigning data) to the main-signal package or detects and warns about the unauthorized access. The main-signal package 11B does not have its configuration shown in FIGS. 7 and 8.

A rack-configured apparatus with a supervisory control target package and a supervisory control package integrated into one unit has been taken by way of example in the description of the above exemplary embodiment. However, the present invention is not limited to the rack-configured apparatus. The invention can also be used in an application between independently operable devices (a supervisory control device and a supervisory control target device) provided that both devices have a master-slave relationship about supervisory control and that the supervisory control device retains monitoring target attributes as an instance associated with the supervisory control target device.

FIG. 9 is an explanatory diagram that represents association between attribute usage flag and attribute effectiveness flag states and existence of a subject of supervisory control. Operation patterns with respect to each state of the attribute usage flag and attribute effectiveness flag are as shown in FIG. 9. Circles in FIG. 9 denote that a value explicitly indicative of "Used" or "Effective" is assigned to the attribute usage flag or the attribute effectiveness flag. Also, x-marks in FIG. 9 denote that the value explicitly indicative of "Used" or "Effective" is not assigned to the attribute usage flag or the attribute effectiveness flag (this fact includes a case in which an initial value or a default value read out from the unused region is assigned instead).

As shown in FIG. 9, in the present invention, supervisory control relating to attributes associated with an added function of the supervisory control target device is judged to be effective, only when: the attribute usage flag managed by the supervisory control device is assigned the value indicative of "Used", and the attribute effectiveness flag managed by the supervisory control target device is assigned the value indicative of "Effective". In all other cases, supervisory control of the added function of the supervisory control target device is judged to be ineffective, since the added function is not regarded as assigned to either the supervisory control source device or the supervisory control target device or both thereof.

Figure 10:
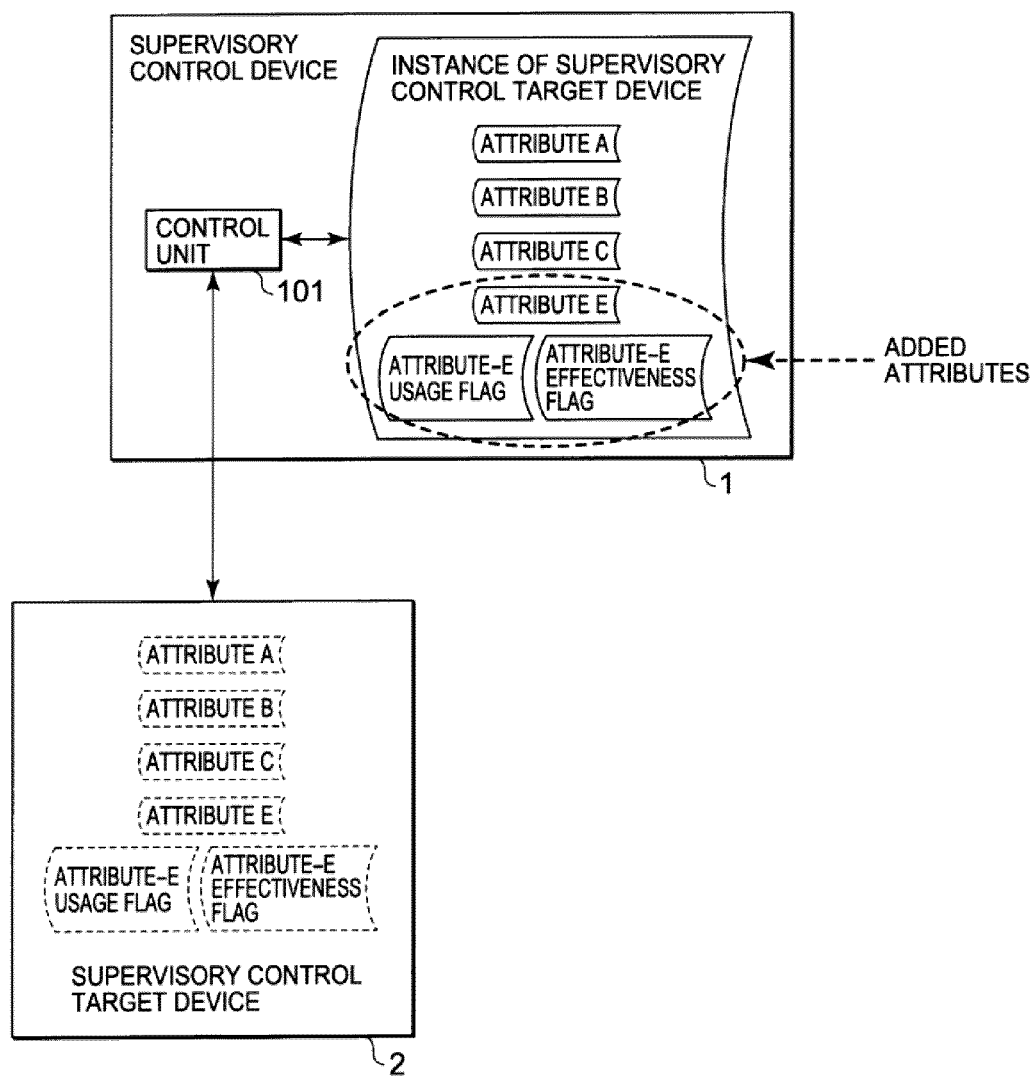
FIG. 10 is a block diagram that shows an outline of the present invention.

Next, the present invention is outlined below. FIG. 10 is a block diagram illustrating the outline of the invention. A supervisory control system according to the invention includes a supervisory control target device 2 (e.g., main-signal package 11A) and a supervisory control device 1 (e.g., supervisory control package 12). Attributes to be subjected to supervisory control in association with an assigned function are defined for the supervisory control target device 2, and the attributes of the supervisory control target device that are to be subjected to supervisory control are retained in the supervisory control device 1 as attributes of an instance associated with the supervisory control target device.

When a function is added to the supervisory control target device 2, an attribute usage flag that indicates whether the supervisory control device 1 supports any changes in the attributes due to the addition of the function, and an attribute effectiveness flag that, as information to which is assigned a value read out from the supervisory control target device 2, indicates whether the supervisory control target device 2 supports the changes, are added, as information concerning the attributes that undergo the changes, to a definition of the instance that the supervisory control device 1 retains.

In addition, the supervisory control device 1 includes a control unit 101 (e.g., a control unit 111). On the basis of the attribute usage flag and attribute effectiveness flag data relating to the attributes undergoing the changes, the control unit 101 determines whether the supervisory control target device 2 supports the new function or whether supervisory control based upon the new function is effective for the attributes undergoing the changes due to the addition of the function.

Adopting such a configuration makes it possible to minimize any changes of the instance for recognizing the kind and details of supervisory control that software of the supervisory control device possesses to monitor and control the supervisory control target device. At the same time, the supervisory control can be conducted safely, even in a case that whereas the supervisory control device supports the new function, the supervisory control target device does not support the new function.

Figure 11:
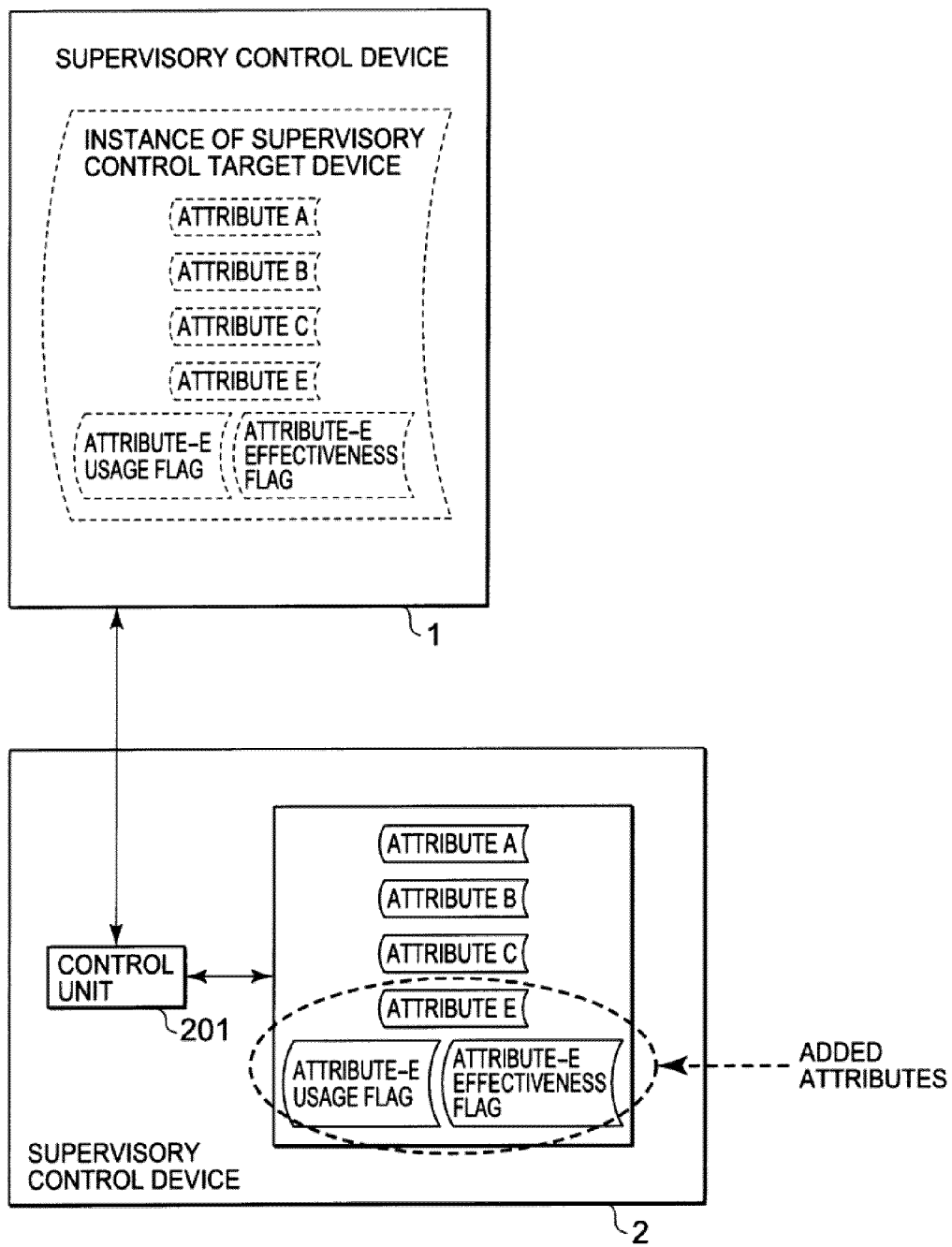
FIG. 11 is an explanatory diagram showing a further configurational example of the present invention.

FIG. 11 is an explanatory diagram showing a further configurational example of the present invention. As shown in FIG. 11, the supervisory control system according to the invention may include the supervisory control target device 2 configured such that when a function is added, an attribute usage flag and an attribute effectiveness flag are added, as information relating to attributes undergoing any changes due to the addition of the function, to a definition of attribute information. The attribute usage flag as the information assigned by the supervisory control device 1, indicates whether the supervisory control device 1 supports the changes, and the attribute effectiveness flag indicates whether the supervisory control target device 2 supports the changes.

In such a case, the supervisory control target device 2 may include a control unit 201 (e.g., a control unit 121) which, on the basis of the attribute usage flag and attribute effectiveness flag data relating to the attributes that undergo the changes, determines whether the supervisory control device supports the new function or whether the supervisory control based upon the new function is effective for the attributes undergoing the changes due to the addition of the function.

Adopting such a configuration makes it possible, even if the software of the supervisory control device does not support the new function, to detect mismatching in composition of assigned functions at the supervisory control target device side, and thus to conduct supervisory control safely.

Figure 12:
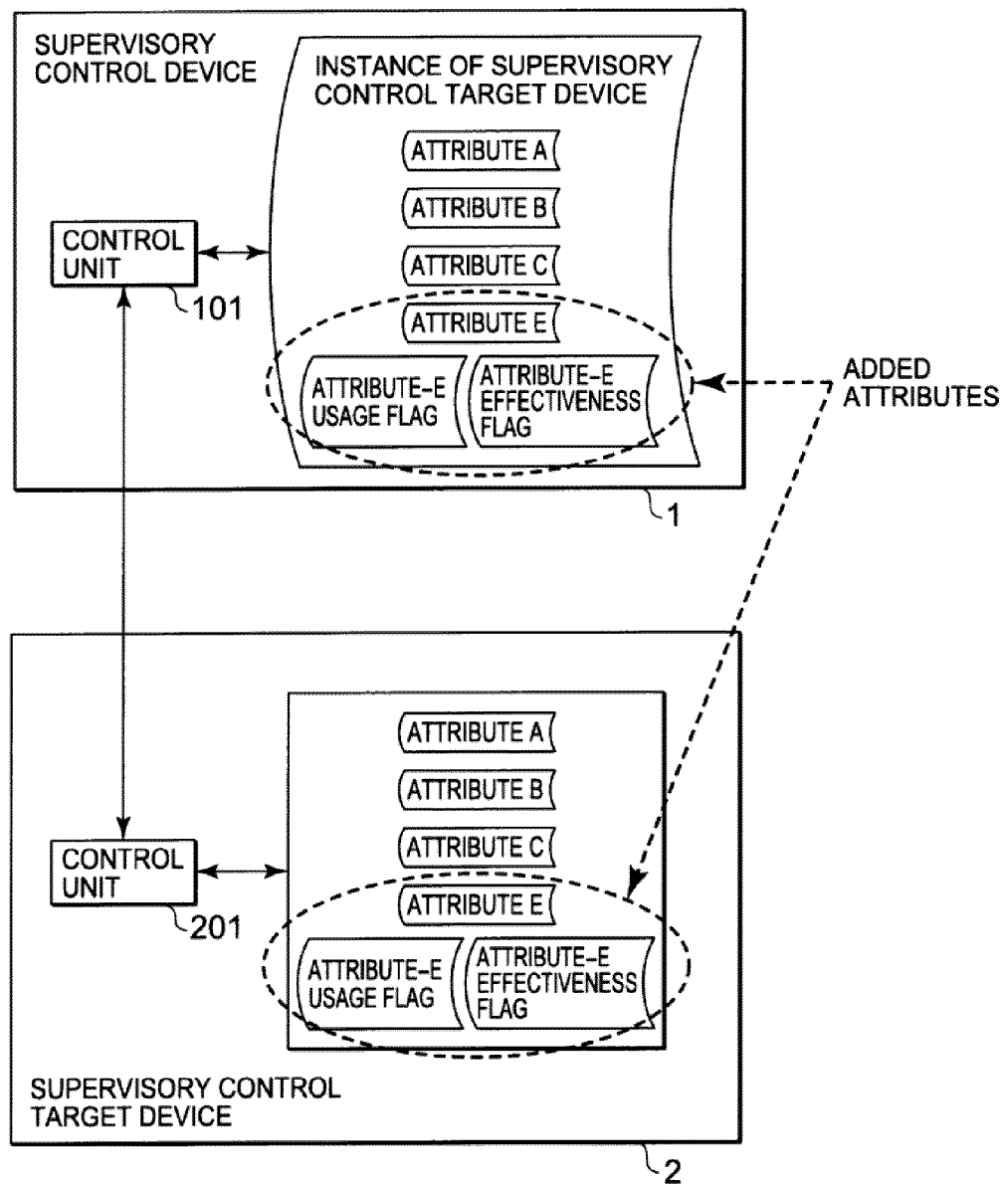
FIG. 12 is an explanatory diagram showing a further configurational example of the present invention.

In order to implement supervisory control safely even in case of state mismatching due to absence of the new function in either the supervisory control device 1 or the supervisory control target device 2, both devices desirably take the above configuration, as shown in FIG. 12. FIG. 12 is an explanatory diagram showing a further configurational example of the present invention.

As shown in FIG. 12, the supervisory control system according to the invention includes the supervisory control device 1 configured such that when a function is added to the supervisory control target device 2, an attribute usage flag and an attribute effectiveness flag are added, as information concerning the attributes undergoing any changes due to the addition of the function, to a definition of the instance that the supervisory control device 1 retains. The attribute usage flag indicates whether the supervisory control device 1 supports the changes, and the attribute effectiveness flag as information to which is assigned a value read out from the supervisory control target device 2, indicates whether the supervisory control target device 2 supports the changes. In addition, the supervisory control device 1 includes the control unit 101. On the basis of the attribute usage flag and attribute effectiveness flag data relating to the attributes undergoing the changes due to the addition of the function, the control unit 101 determines whether the supervisory control target device supports the new function or whether supervisory control based upon the new function is effective for the attributes undergoing the changes due to the addition of the function.

Furthermore, the supervisory control target device 2 is configured such that when a function is added, an attribute usage flag and an attribute effectiveness flag are added, as information concerning the attributes that undergo any changes due to the addition of the function, to a definition of the attribute information that the supervisory control target device 2 retains. The attribute usage flag that is information assigned by the supervisory control device 1 indicates whether the supervisory control device 1 supports the changes, and the attribute effectiveness flag indicates whether the supervisory control target device 2 supports the changes. In addition, the supervisory control target device 2 includes the control unit 201. On the basis of the attribute usage flag and attribute effectiveness flag data relating to the attributes undergoing the changes due to the addition of the function, the control unit 201 determines whether the supervisory control device 1 supports the new function or whether supervisory control based upon the new function is effective for the attributes undergoing the changes due to the addition of the function.

Figure 13:
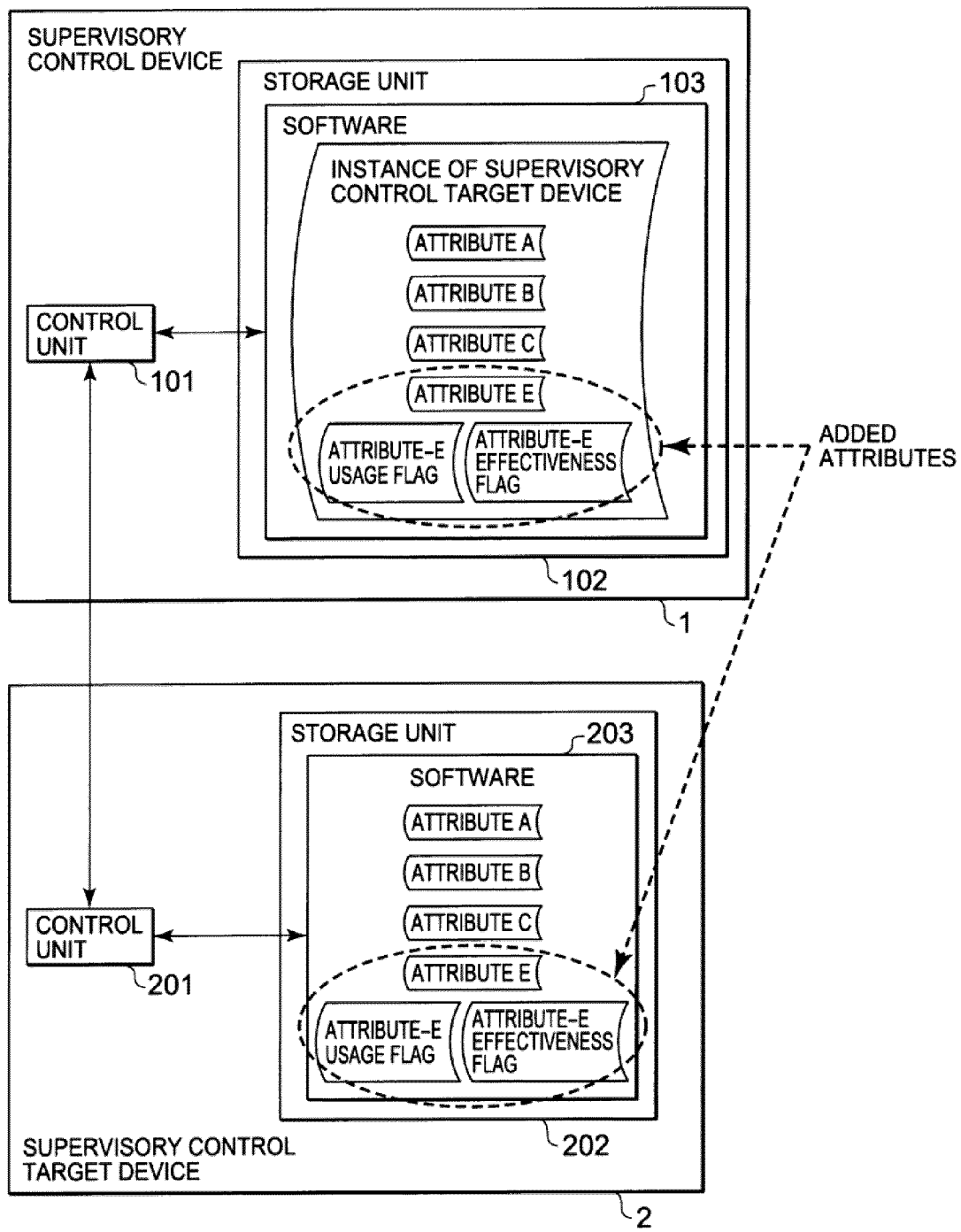
FIG. 13 is an explanatory diagram showing a further configurational example of the present invention.

The configuration shown in FIG. 13 may be adopted as an example of retaining attribute information. FIG. 13 is an explanatory diagram showing a further configurational example of the present invention. As shown in FIG. 13, the supervisory control device 1 may include a storage device 102 (e.g., a storage unit 122) for storage of software 103 (e.g., software 123). An attribute usage flag and an attribute effectiveness flag are added, as the information relating to the attributes that undergo any changes due to the addition of the function, to a definition of the instance in software 103 containing defined existing attributes of the supervisory control target device 2 that are to be subjected to supervisory control as attributes of an instance associated with the supervisory control target device 2. The attribute usage flag indicates whether the supervisory control device 1 supports the changes, and the attribute effectiveness flag as the information assigned from the supervisory control target device 2, indicates whether the supervisory control target device 2 supports the changes. In such a case, pursuant to the software 103 stored within the storage device 102, for example, the control unit 101 of the supervisory control device 1 determines whether the supervisory control target device supports the new function or whether supervisory control based upon the new function is effective for the attributes undergoing the changes due to the addition of the function.

Upon detecting any differences in composition of assigned functions between the supervisory control device 1 and the supervisory control target device 2, the control unit 101 of the supervisory control device 1 may notify an upper-level supervisory system of that effect.

In addition, as shown in FIG. 13, the supervisory control target device 2 may include a storage device 202 (e.g., a storage unit 112) for storage of software 203 (e.g., software 113). An attribute usage flag which, as the information assigned by the supervisory control device 1, indicates whether the supervisory control device 1 supports any changes in the attributes due to addition of a function, and an attribute effectiveness flag that indicates whether the supervisory control target device 2 supports the changes, are added, as the information relating to the attributes that undergo the changes due to the addition of the function, to a definition of the attribute information in the software 203 containing defined existing attributes that are to be subjected to supervisory control. In such a case, pursuant to the software 203 stored within the storage device 202, for example, the control unit 201 of the supervisory control target device 2 determines whether the supervisory control device 1 supports the new function or whether supervisory control based upon the new function is effective for the attributes undergoing the changes due to the addition of the function.

Furthermore, the attribute usage flag may be formed such that a desired value read out from an unused region of the storage device of the supervisory control device is defined as the value indicative of "Not used", and the attribute effectiveness flag may be formed such that a desired value read out from an unused region of the storage device of the supervisory control target device is defined as the value indicative of "Ineffective".

Moreover, the supervisory control system may be implemented as a rack-configured apparatus (e.g., a trunk transmission apparatus) in which a plurality of packages, inclusive of at least a supervisory control target package for realizing a specific function and a supervisory control package for conducting supervisory control upon the supervisory control target package, are mounted in one rack and configured as one unit.

Besides, during addition of a function, when an attribute is added, an attribute usage flag and attribute effectiveness flag relating to the added attribute may be added as information concerning the attributes that undergo the changes due to the addition of the function. Additionally, for example, if the addition of the function changes a range of data assignable to an existing attribute, there may be added an attribute usage flag and attribute effectiveness flag relating to a new data range usable after the change of the attribute. Furthermore, if the addition of the function causes an existing attribute to be excluded from supervisory control, an attribute usage flag and attribute effectiveness flag relating to deletion of the attribute may be added.

Figure 14:
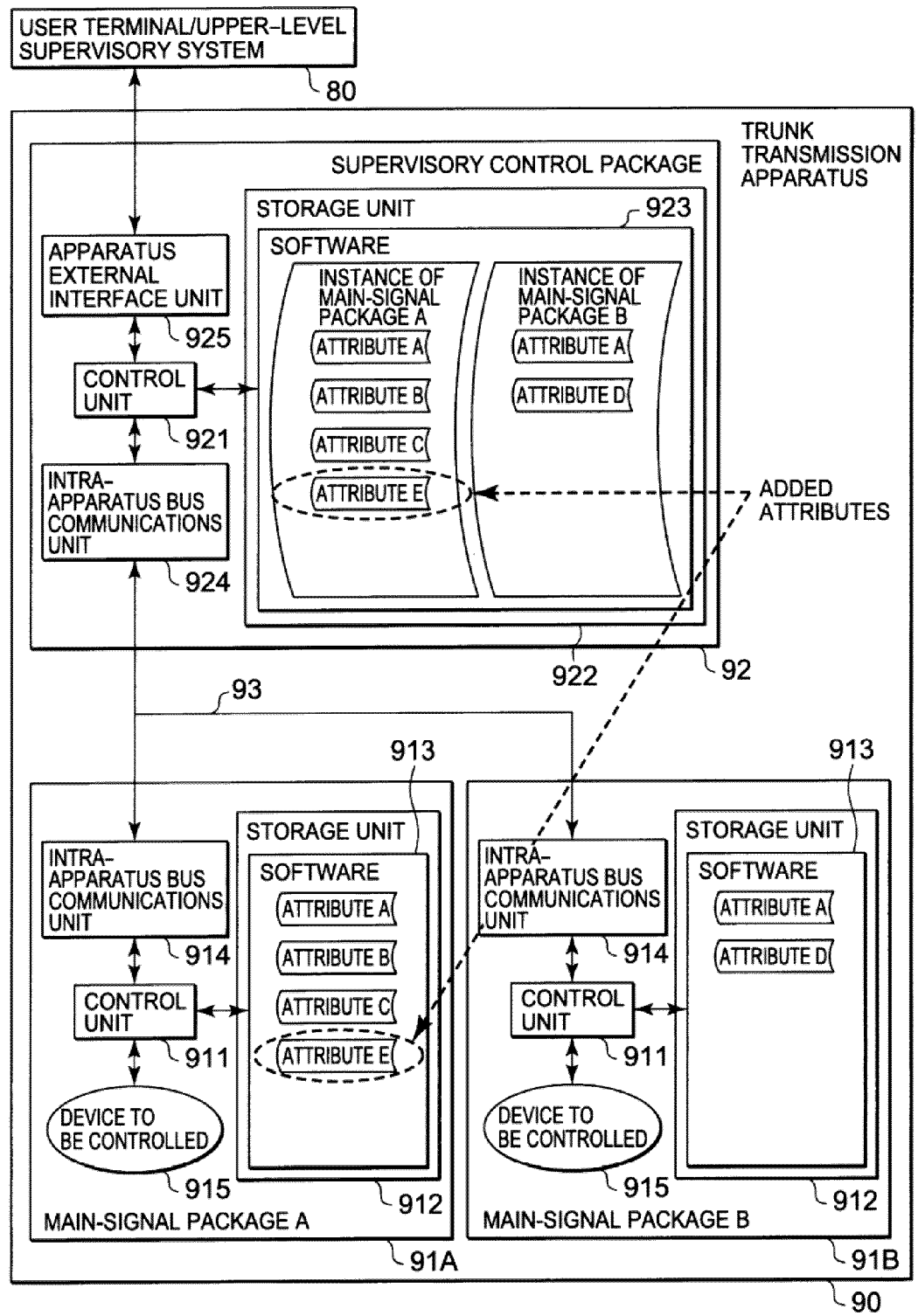
FIG. 14 is an explanatory diagram showing another example of a trunk transmission apparatus configuration.

FIG. 14 is an explanatory diagram showing an example of a trunk transmission apparatus configuration. In the example of FIG. 14, the trunk transmission apparatus 90 includes a plurality of main-signal packages 91 (in the present example, packages 91A and 91B) that each transmit main signals, and a supervisory control package 92 that monitors each main-signal package 91. The main-signal package 91 and the supervisory control package 92 are interconnected using a communications bus 93 for transmitting various information in the apparatus. A master-slave relationship relating to supervisory control is formed between the supervisory control package 92 and the main-signal package 91 (supervisory control target package).

The main-signal package 91 includes a control unit 911 and a storage unit 912. The control unit 911 into which software 913 saved in the storage unit 912 has been loaded controls various operation of the main-signal package 91.

The main-signal package 91 also includes an intra-apparatus bus communications unit 914 for communication with at least the supervisory control package 92 mounted in the trunk transmission apparatus, and a control target device 915 for transmitting the main signals.

The supervisory control package 92 includes a control unit 921 and a storage unit 922. The control unit 921 into which software 923 saved in the storage unit 922 has been loaded controls various operation of the supervisory control package 92.

The supervisory control package 92 also includes an intra-apparatus bus communications unit 924 for communication with at least the main-signal package 91 mounted in the trunk transmission apparatus, and an apparatus external interface unit 925 for communication with an upper-level supervisory system 80 including a user terminal. In the example of FIG. 14, the user terminal and the upper-level supervisory system are shown as elements of the same hierarchical level. Hereunder, however, the user terminal will be simply described as the upper-level supervisory system 80, since the user terminal can also be regarded as one constituent element of the system in that both deliver instructions to the supervisory control package.

The software 923 of the supervisory control package 92 retains instances each having attribute information (such as settings, alarms, and performance) on each main-signal package 91 that is to be subjected to supervisory control. The upper-level supervisory system 80 connects to the trunk transmission apparatus 90 (more specifically, the supervisory control package 92) and conducts supervisory control from the outside by, for example, executing a supervisory control command, for each instance that the software 923 retains.

The software 923 of the supervisory control package 92 responds to an external control request by interpreting the supervisory control command sent from the upper-level supervisory system 80, and checking the command against the attributes that the instance possesses. For example, in the control unit 921, the kind and details of control relating to an instance requested by the supervisory control command are compared with the attribute information (such as data type, data range, and operating parameters) that the instance retains. If comparison results indicate normality, the control unit 921 judges the command to be effective, and executes a supervisory or control process upon the associated main-signal package 91. For example, the control unit 921 transmits a supervisory/control command. Conversely if comparison results indicate an abnormality, the control unit 921 judges the command to be ineffective, and returns a command error response instead of conducting the supervisory or control process upon the main-signal package 91.

The software 913 of the main-signal package 91 possesses the information (such as settings, alarms, and performance) relating to the main-signal package 91, as attribute data. Pursuant to the supervisory/control command from the supervisory control package 92, the software 913 reads out a state of the control target device 915 within the main-signal package 91 and notifies the state or controls the control target device 915.

In such a configuration, the supervisory control package 92 has a risk of conducting unauthorized access to a main-signal package for which an added function is not supported. This is because, since the software 923 of the supervisory control package 92 recognizes an operational object by the attributes that the software itself possesses for the instances of each main-signal package, the software cannot accurately judge whether the main-signal package 91 supports the added attributes. In the example of FIG. 14, a main-signal package supporting an added function, and a main-signal package not supporting the added function are mixedly present in one unit. This problem, however, also applies to a case in which, when software of a single supervisory control package is applied between a plurality of devices in a key network, at least one device with a main-signal package supporting an added function, and at least one device with a main-signal package not supporting the added function are mixedly present.

If the data management method in a distributed computer system, described in Patent Document 1, is applied to the relationship between the supervisory control package and supervisory control target package in the trunk transmission apparatus, awareness of the existence of a function already recognized or certain to be added in the future can be matched between the supervisory control package and the supervisory control target package. The data management method described in Patent Document 1, however, does not allow for any risks due to mismatching in the presence/absence of an assigned function between the devices involved in supervisory control with a master-slave relationship, as between a supervisory control device and a supervisory control target device. When a function is added in the future, therefore, if a mismatch in the recognition of the assigned function occurs between the devices involved in supervisory control with the master-slave relationship, as between the supervisory control device and the supervisory control target device, the mismatch will not allow safe supervisory control.

An exemplary advantage according to the present invention exists in that, when a function is added, even if a mismatch in the presence/absence of the added function occurs between the devices involved in supervisory control with a master-slave relationship, as between a supervisory control device and a supervisory control target device, the supervisory control can be conducted safely, while at the same time, minimizing any changes of an instance for recognizing the kind and details of supervisory control that software of the supervisory control device possesses to monitor and control the supervisory control target device.

The present invention can be applied to a system that includes a supervisory control device and supervisory control target device involved in supervisory control with a master-slave relationship. The invention can also be suitably applied particularly to a system developed using a non-object-oriented environment in which attributes are inherited.

While the present invention has been shown and described with reference particularly to exemplary embodiments thereof, the invention is not limited to these embodiments. It will be understood by persons of ordinary skill in the art that various changes in form and details may be made therein without departing from the spirit and scope of the invention as defined by the appended claims.

An example 1 describes a supervisory control system comprising: a supervisory control target device for which attributes to be subjected to supervisory control are defined in association with an existing function of the supervisory control target device; and a supervisory control device by which the attributes of the supervisory control target device that are to be subjected to supervisory control are retained as attributes of an instance associated with the supervisory control target device; wherein: the supervisory control device is configured such that when a function is added to the supervisory control target device, an attribute usage flag that indicates whether the supervisory control device supports any changes in the attributes due to the addition of the function, and an attribute effectiveness flag which, as information to which is assigned a value read out from the supervisory control target device, indicates whether the supervisory control target device supports the changes, are added, as information concerning the attributes that undergo the changes, to a definition of the instance which the supervisory control device retains; and the supervisory control device includes control means for, on the basis of data of the attribute usage flag and attribute effectiveness flag relating to the attributes undergoing the changes due to the addition of the function, determining at least one of whether the supervisory control target device supports the new function and whether supervisory control based upon the new function is effective for the attributes undergoing the changes due to the addition of the function.

An example 2 describes another supervisory control system comprising: a supervisory control target device for which attributes to be subjected to supervisory control are defined in association with an existing function of the supervisory control target device; and a supervisory control device by which the attributes of the supervisory control target device that are to be subjected to supervisory control are retained as attributes of an instance associated with the supervisory control target device; wherein: the supervisory control target device is configured such that when a function is added, an attribute usage flag which, as information assigned by the supervisory control device, indicates whether the supervisory control device supports any changes in the attributes due to the addition of the function, and an attribute effectiveness flag that indicates whether the supervisory control target device supports the changes, are added, as information concerning the attributes that undergo the changes, to a definition of attribute information in the supervisory control target device; and the supervisory control target device includes control means for, on the basis of data of the attribute usage flag and attribute effectiveness flag relating to the attributes that undergo the changes due to the addition of the function, determining at least one of whether the supervisory control device supports the new function and whether supervisory control based upon the new function is effective for the attributes undergoing the changes due to the addition of the function.

An example 3 describes yet another supervisory control system comprising: a supervisory control target device for which attributes to be subjected to supervisory control are defined in association with an existing function of the supervisory control target device; and a supervisory control device by which the attributes of the supervisory control target device that are to be subjected to supervisory control are retained as attributes of an instance associated with the supervisory control target device; wherein: the supervisory control device is configured such that when a function is added to the supervisory control target device, an attribute usage flag that indicates whether the supervisory control device supports any changes in the attributes due to the addition of the function, and an attribute effectiveness flag which, as information to which is assigned a value read out from the supervisory control target device, indicates whether the supervisory control target device supports the changes, are added, as information concerning the attributes that undergo the changes, to a definition of the instance which the supervisory control device retains; the supervisory control device includes control means for, on the basis of data of the attribute usage flag and attribute effectiveness flag relating to the attributes undergoing the changes due to the addition of the function, determining at least one of whether the supervisory control target device supports the new function and whether supervisory control based upon the new function is effective for the attributes undergoing the changes due to the addition of the function; the supervisory control target device is configured such that when a function is added, an attribute usage flag which, as information assigned by the supervisory control device, indicates whether the supervisory control device supports any changes in the attributes due to the addition of the function, and an attribute effectiveness flag that indicates whether the supervisory control target device supports the changes, are added, as information concerning the attributes that undergo the changes, to a definition of attribute information in the supervisory control target device; and the supervisory control target device includes control means for, on the basis of data of the attribute usage flag and attribute effectiveness flag relating to the attributes that undergo the changes due to the addition of the function, determining at least one of whether the supervisory control device supports the new function and whether supervisory control based upon the new function is effective for the attributes undergoing the changes due to the addition of the function.

An example 4 describes a further supervisory control system, wherein the supervisory control device includes a storage device for storage of software in which existing attributes of a supervisory control target device that are to be subjected to supervisory control are defined as attributes of an instance associated with the supervisory control target device, the software being devised such that an attribute usage flag which indicates whether the supervisory control device supports any changes in the attributes due to addition of a function, and an attribute effectiveness flag which, as information assigned from the supervisory control target device, indicates whether the supervisory control target device supports the changes, are added, as information that relates to the attributes undergoing the changes, to a definition of the instance in the software; and in accordance with the software stored within the storage device, the control means of the supervisory control device determines at least one of whether the supervisory control target device supports the new function and whether supervisory control based upon the new function is effective for the attributes undergoing the changes due to the addition of the function.

An example 5 describes a further supervisory control system, wherein, upon detecting any differences in composition of assigned functions between the supervisory control device and a supervisory control target device, the control means of the supervisory control device notifies an upper-level supervisory system of that effect.

An example 6 describes a further supervisory control system, wherein the supervisory control target device includes a storage device for storage of software with defined existing attributes that are to be subjected to supervisory control, the software being devised such that an attribute usage flag which, as information assigned by the supervisory control device, indicates whether the supervisory control device supports any changes in the attributes due to addition of a function, and an attribute effectiveness flag which indicates whether the supervisory control target device supports the changes, are added, as information that relates to the attributes undergoing the changes, to a definition of the attribute information in the software; and in accordance with the software stored within the storage device, the control means of the supervisory control target device determines at least one of whether the supervisory control device supports the new function and whether supervisory control based upon the new function is effective for the attributes undergoing the changes due to the addition of the function.

An example 7 describes a further supervisory control system, wherein: the attribute usage flag is formed such that a desired value read out from an unused region of a storage device of the supervisory control device is defined as a value indicative of "Not used"; and the attribute effectiveness flag is formed such that a desired value read out from an unused region of a storage device of the supervisory control target device is defined as a value indicative of "Ineffective".

An example 8 describes a further supervisory control system, wherein, a rack-configured apparatus in which a plurality of packages, inclusive of at least a supervisory control target package for realizing a specific function and a supervisory control package for conducting supervisory control upon the supervisory control target package, are mounted in one rack and configured as one unit, is implemented as the supervisory control system.

An example 9 describes a method of supervisory control conducted between a supervisory control target device and a supervisory control device, both having a master-slave relationship, wherein: the supervisory control device retaining the supervisory control target attributes which is defined in association with an existing function of the supervisory control target device as attributes of an instance associated with the supervisory control target device is configured such that when a function is added to the supervisory control target device, an attribute usage flag that indicates whether the supervisory control device supports any changes in the attributes due to the addition of the function, and an attribute effectiveness flag that, as information to which is assigned a value read out from the supervisory control target device, indicates whether the supervisory control target device supports the changes, are added, as information relating to the attributes that undergo the changes, to a definition of the instance in the supervisory control device; and on the basis of the attribute usage flag and attribute effectiveness flag data relating to the attributes that undergo the changes due to the addition of the function, the supervisory control device determines at least one of whether the supervisory control target device supports the new function and whether supervisory control based upon the new function is effective for the attributes undergoing the changes due to the addition of the function.

An example 10 describes another supervisory control method, wherein, upon detecting any differences in composition of assigned functions between the supervisory control device and a supervisory control target device, the supervisory control device notifies an upper-level supervisory system of that effect.

An example 11 describes yet another method of supervisory control conducted between a supervisory control target device and a supervisory control device, both having a master-slave relationship, wherein: the supervisory control target device for which attributes to be subjected to supervisory control are defined in association with an existing function of the supervisory control target device is configured such that when a function is added, an attribute usage flag which, as information assigned by the supervisory control device, indicates whether the supervisory control device supports any changes in the attributes due to the addition of the function, and an attribute effectiveness flag that indicates whether the supervisory control target device supports the changes, are added, as information concerning the attributes that undergo the changes, to a definition of attribute information in the supervisory control target device; and on the basis of data of the attribute usage flag and attribute effectiveness flag relating to the attributes that undergo the changes due to the addition of the function, the supervisory control target device determines at least one of whether the supervisory control device supports the new function and whether supervisory control based upon the new function is effective for the attributes undergoing the changes due to the addition of the function.

An example 12 describes a supervisory control method, wherein: at least the attribute usage flags of both devices are each formed such that a desired value read out from an unused region of a storage device of the supervisory control device is defined as a value indicative of "Not used"; and at least the attribute effectiveness flags of both devices are each formed such that a desired value read out from an unused region of a storage device of the supervisory control target device is defined as a value indicative of "Ineffective".

An example 13 describes another form of supervisory control method, wherein: only when an attribute usage flag added as information relating to attributes that undergo any changes due to addition of a function takes a value indicative of "Used" for the attributes and an attribute effectiveness flag takes a value indicative of "Effective" for the attributes, will either a supervisory control device or a supervisory control target device regard an assignment state of the new function associated with the attributes, as differing between the supervisory control device and the supervisory control target device, and judge that supervisory control based upon the new function is effective.

An example 14 describes a program for supervisory control conducted between a supervisory control target device for which attributes to be subjected to supervisory control are defined in association with an existing function of the supervisory control target device, and a supervisory control device retaining the supervisory control target attributes of the supervisory control target device as attributes of an instance associated with the supervisory control target device, wherein: in accordance with the supervisory control program applied to the supervisory control device, a computer in which, when a function is added to the supervisory control target device, an attribute usage flag that indicates whether the supervisory control device supports any changes in the attributes due to addition of a function, and an attribute effectiveness flag that, as information to which is assigned a value read out from the supervisory control target device, indicates whether the supervisory control target device supports the changes are added, as information relating to the attributes that undergo the changes, to a definition of the instance, executes the process of checking the attribute usage flag and attribute effectiveness flag data concerning the attributes that undergo the changes due to the addition of the function, and then determining at least one of whether the supervisory control target device supports the new function- and whether supervisory control based upon the new function is effective for the attributes undergoing the changes due to the addition of the function.

An example 15 describes another program for supervisory control conducted between a supervisory control target device for which attributes to be subjected to supervisory control are defined in association with an existing function of the supervisory control target device, and a supervisory control device retaining the supervisory control target attributes of the supervisory control target device as attributes of an instance associated with the supervisory control target device, wherein: in accordance with the supervisory control program applied to the supervisory control target device, a computer in which, when a function is added, an attribute usage flag that, as information assigned by the supervisory control device, indicates whether the supervisory control device supports any changes in the attributes due to addition of a function, and an attribute effectiveness flag that indicates whether the supervisory control target device supports the changes are added, as information relating to the attributes that undergo the changes, to a definition of the information concerning the attributes, executes the process of checking the attribute usage flag and attribute effectiveness flag data concerning the attributes that undergo the changes due to the addition of the function, and then determining at least one of whether the supervisory control device supports the new function and whether supervisory control based upon the new function is effective for the attributes undergoing the changes due to the addition of the function.

The invention claimed is:

1. A supervisory control system comprising:
    a supervisory control target device for which attributes to be subjected to supervisory control are defined in association with an existing function of the supervisory control target device; and
    a supervisory control device by which the attributes of the supervisory control target device that are to be subjected to supervisory control are retained as attributes of an instance associated with the supervisory control target device;
    wherein: the supervisory control device is configured such that when a function is added to the supervisory control target device, an attribute usage flag that indicates whether the supervisory control device supports any changes in the attributes due to adding of the function, and an attribute effectiveness flag which, as information to which is assigned a value read out from the supervisory control target device, indicates whether the supervisory control target device supports the changes, are added, as information concerning the attributes that undergo the changes, to a definition of the instance which the supervisory control device retains; and
    the supervisory control device includes a control unit implemented at least by a hardware including a processor and which, on a basis of data of the attribute usage flag and attribute effectiveness flag relating to the attributes undergoing the changes due to the addition of the function, determines at least one of whether the supervisory control target device supports a new function and whether supervisory control based upon the new function is effective for the attributes undergoing the changes due to the addition of the function.

2. The supervisory control system according to claim 1, wherein: the supervisory control device includes a storage device for storage of software in which existing attributes of a supervisory control target device that are to be subjected to supervisory control are defined as attributes of an instance associated with the supervisory control target device, the software being devised such that an attribute usage flag which indicates whether the supervisory control device supports any changes in the attributes due to addition of a function, and an attribute effectiveness flag which, as information assigned from the supervisory control target device, indicates whether the supervisory control target device supports the changes, are added, as information that relates to the attributes undergoing the changes, to a definition of the instance in the software; and
    in accordance with the software stored within the storage device, the control unit of the supervisory control device determines at least one of whether the supervisory control target device supports a new function and whether supervisory control based upon the new function is effective for the attributes undergoing the changes due to the addition of the function.

3. The supervisory control system according to claim 1,
wherein: upon detecting any differences in composition of assigned functions between the supervisory control device and a supervisory control target device, the control unit of the supervisory control device notifies an upper-level supervisory system of that effect.

4. The supervisory control system according to claim 1,
wherein: the attribute usage flag is formed such that a desired value read out from an unused region of a storage device of the supervisory control device is defined as a value indicative of "Not used"; and
the attribute effectiveness flag is formed such that a desired value read out from an unused region of a storage device of the supervisory control target device is defined as a value indicative of "Ineffective".

5. The supervisory control system according to claim 1,
wherein: a rack-configured apparatus in which a plurality of packages, inclusive of at least a supervisory control target package for realizing a specific function and a supervisory control package for conducting supervisory control upon the supervisory control target package, are mounted in one rack and configured as one unit, is implemented as the supervisory control system.

6. A supervisory control system comprising:
a supervisory control target device for which attributes to be subjected to supervisory control are defined in association with an existing function of the supervisory control target device; and
a supervisory control device by which the attributes of the supervisory control target device that are to be subjected to supervisory control are retained as attributes of an instance associated with the supervisory control target device;
wherein: the supervisory control device is configured such that when a function is added to the supervisory control target device, an attribute usage flag that indicates whether the supervisory control device supports any changes in the attributes due to an addition of the function, and an attribute effectiveness flag which, as information to which is assigned a value read out from the supervisory control target device, indicates whether the supervisory control target device supports the changes, are added, as information concerning the attributes that undergo the changes, to a definition of the instance which the supervisory control device retains; and
the supervisory control device includes control means implemented at least by a hardware including a processor and for, on a basis of data of the attribute usage flag and attribute effectiveness flag relating to the attributes undergoing the changes due to the addition of the function, determining at least one of whether the supervisory control target device supports a new function and whether supervisory control based upon the new function is effective for the attributes undergoing the changes due to the addition of the function.

7. A supervisory control system comprising:
a supervisory control target device for which attributes to be subjected to supervisory control are defined in association with an existing function of the supervisory control target device; and
a supervisory control device by which the attributes of the supervisory control target device that are to be subjected to supervisory control are retained as attributes of an instance associated with the supervisory control target device;
wherein: the supervisory control target device is configured such that when a function is added, an attribute usage flag which, as information assigned by the supervisory control device, indicates whether the supervisory control device supports any changes in the attributes due to the addition of the function, and an attribute effectiveness flag that indicates whether the supervisory control target device supports the changes, are added, as information concerning the attributes that undergo the changes, to a definition of attribute information in the supervisory control target device; and
the supervisory control target device includes a control unit implemented at least by a hardware including a processor and which, on a basis of data of the attribute usage flag and attribute effectiveness flag relating to the attributes that undergo the changes due to the addition of the function, determines at least one of whether the supervisory control device supports a new function and whether supervisory control based upon the new function is effective for the attributes undergoing the changes due to the addition of the function.

8. The supervisory control system according to claim 7,
wherein: the supervisory control target device includes a storage device for storage of software with defined existing attributes that are to be subjected to supervisory control, the software being devised such that an attribute usage flag which, as information assigned by the supervisory control device, indicates whether the supervisory control device supports any changes in the attributes due to addition of a function, and an attribute effectiveness flag which indicates whether the supervisory control target device supports the changes, are added, as information that relates to the attributes undergoing the changes, to a definition of the attribute information in the software; and
in accordance with the software stored within the storage device, a control unit of the supervisory control target device determines at least one of whether the supervisory control device supports a new function and whether supervisory control based upon the new function is effective for the attributes undergoing the changes due to the addition of the function.

9. A supervisory control system comprising:
a supervisory control target device for which attributes to be subjected to supervisory control are defined in association with an existing function of the supervisory control target device; and
a supervisory control device by which the attributes of the supervisory control target device that are to be subjected to supervisory control are retained as attributes of an instance associated with the supervisory control target device;
wherein: the supervisory control target device is configured such that when a function is added, an attribute usage flag which, as information assigned by the supervisory control device, indicates whether the supervisory control device supports any changes in the attributes due to the addition of the function, and an attribute effectiveness flag that indicates whether the supervisory control target device supports the changes, are added, as information concerning the attributes that undergo the changes, to a definition of attribute information in the supervisory control target device; and
the supervisory control target device includes control means implemented at least by a hardware including a processor and for, on a basis of data of the attribute usage flag and attribute effectiveness flag relating to the attributes that undergo the changes due to the addition of the function, determining at least one of whether the supervisory control device supports a new function and whether supervisory control based upon the new function is effective for the attributes undergoing the changes due to the addition of the function.

10. A supervisory control system comprising:
a supervisory control target device for which attributes to be subjected to supervisory control are defined in association with an existing function of the supervisory control target device; and
a supervisory control device by which the attributes of the supervisory control target device that are to be subjected to supervisory control are retained as attributes of an instance associated with the supervisory control target device;
wherein: the supervisory control device is configured such that when a function is added to the supervisory control target device, an attribute usage flag that indicates whether the supervisory control device supports any changes in the attributes due to an addition of the function, and an attribute effectiveness flag which, as information to which is assigned a value read out from the supervisory control target device, indicates whether the supervisory control target device supports the changes, are added, as information concerning the attributes that undergo the changes, to a definition of the instance which the supervisory control device retains;
the supervisory control device includes a control unit implemented at least by a hardware including a processor and which, on a basis of data of the attribute usage flag and attribute effectiveness flag relating to the attributes undergoing the changes due to the addition of the function, determines at least one of whether the supervisory control target device supports a new function and whether supervisory control based upon a new function is effective for the attributes undergoing the changes due to the addition of the function;
the supervisory control target device is configured such that when a function is added, an attribute usage flag which, as information assigned by the supervisory control device, indicates whether the supervisory control device supports any changes in the attributes due to the addition of the function, and an attribute effectiveness flag that indicates whether the supervisory control target device supports the changes, are added, as information concerning the attributes that undergo the changes, to a definition of attribute information in the supervisory control target device; and
the supervisory control target device includes a control unit implemented at least by a hardware including a processor and which, on the basis of data of the attribute usage flag and attribute effectiveness flag relating to the attributes that undergo the changes due to the addition of the function, determines at least one of whether the supervisory control device supports the new function and whether supervisory control based upon the new function is effective for the attributes undergoing the changes due to the addition of the function.

11. The supervisory control system according to claim 10, wherein: the supervisory control device includes a storage device for storage of software in which existing attributes of a supervisory control target device that are to be subjected to supervisory control are defined as attributes of an instance associated with the supervisory control target device, the software being devised such that an attribute usage flag which indicates whether the supervisory control device supports any changes in the attributes due to addition of a function, and an attribute effectiveness flag which, as information assigned from the supervisory control target device, indicates whether the supervisory control target device supports the changes, are added, as information that relates to the attributes undergoing the changes, to a definition of the instance in the software; and
in accordance with the software stored within the storage device, the control unit of the supervisory control device determines at least one of whether the supervisory control target device supports a new function and whether supervisory control based upon the new function is effective for the attributes undergoing the changes due to the addition of the function.

12. The supervisory control system according to claim 10, wherein: the supervisory control target device includes a storage device for storage of software with defined existing attributes that are to be subjected to supervisory control, the software being devised such that an attribute usage flag which, as information assigned by the supervisory control device, indicates whether the supervisory control device supports any changes in the attributes due to addition of a function, and an attribute effectiveness flag which indicates whether the supervisory control target device supports the changes, are added, as information that relates to the attributes undergoing the changes, to a definition of the attribute information in the software; and
in accordance with the software stored within the storage device, the control unit of the supervisory control target device determines at least one of whether the supervisory control device supports the new function and whether supervisory control based upon the new function is effective for the attributes undergoing the changes due to the addition of the function.

13. A method of supervisory control conducted between a supervisory control target device and a supervisory control device, both having a master-slave relationship,
wherein: the supervisory control device retaining the supervisory control target attributes which is defined in association with an existing function of the supervisory control target device as attributes of an instance associated with the supervisory control target device is configured, using a processor, such that when a function is added to the supervisory control target device, an attribute usage flag that indicates whether the supervisory control device supports any changes in the attributes due to the addition of the function, and an attribute effectiveness flag that, as information to which is assigned a value read out from the supervisory control target device, indicates whether the supervisory control target device supports the changes, are added, as information relating to the attributes that undergo the changes, to a definition of the instance in the supervisory control device; and
on a basis of the attribute usage flag and attribute effectiveness flag data relating to the attributes that undergo the changes due to the addition of the function, the supervisory control device determines, using a processor, at least one of whether the supervisory control target device supports a new function and whether supervisory control based upon the new function is effective for the attributes undergoing the changes due to the addition of the function.

14. The supervisory control method according to claim 13, wherein: upon detecting any differences in composition of assigned functions between the supervisory control device and a supervisory control target device, the supervisory control device notifies an upper-level supervisory system of that effect.

15. The supervisory control method according to claim 13, wherein: at least the attribute usage flags of both devices are each formed such that a desired value read out from an unused region of a storage device of the supervisory control device is defined as a value indicative of "Not used"; and at least the attribute effectiveness flags of both devices are each formed such that a desired value read out from an unused region of a storage device of the supervisory control target device is defined as a value indicative of "Ineffective".

16. The supervisory control method according to claim 13, wherein: only when an attribute usage flag added as information relating to attributes that undergo any changes due to addition of a function takes a value indicative of "Used" for the attributes and an attribute effectiveness flag takes a value indicative of "Effective" for the attributes, will either a supervisory control device or a supervisory control target device regard an assignment state of the new function associated with the attributes, as differing between the supervisory control device and the supervisory control target device, and judge that supervisory control based upon the new function is effective.

17. A method of supervisory control conducted between a supervisory control target device and a supervisory control device, both having a master-slave relationship,
wherein: the supervisory control target device for which attributes to be subjected to supervisory control are defined in association with an existing function of the supervisory control target device is configured, using a processor, such that when a function is added, an attribute usage flag which, as information assigned by the supervisory control device, indicates whether the supervisory control device supports any changes in the attributes due to the addition of the function, and an attribute effectiveness flag that indicates whether the supervisory control target device supports the changes, are added, as information concerning the attributes that undergo the changes, to a definition of attribute information in the supervisory control target device; and on a basis of data of the attribute usage flag and attribute effectiveness flag relating to the attributes that undergo the changes due to the addition of the function, the supervisory control target device determines, using a processor, at least one of whether the supervisory control device supports a new function and whether supervisory control based upon the new function is effective for the attributes undergoing the changes due to the addition of the function.

18. A non-transitory computer readable medium having stored thereon a program for supervisory control conducted between a supervisory control target device for which attributes to be subjected to supervisory control are defined in association with an existing function of the supervisory control target device, and a supervisory control device retaining the supervisory control target attributes of the supervisory control target device as attributes of an instance associated with the supervisory control target device, wherein: in accordance with the supervisory control program applied to the supervisory control device, a computer in which, when a function is added to the supervisory control target device, an attribute usage flag that indicates whether the supervisory control device supports any changes in the attributes due to addition of a function, and an attribute effectiveness flag that, as information to which is assigned a value read out from the supervisory control target device, indicates whether the supervisory control target device supports the changes are added, as information relating to the attributes that undergo the changes, to a definition of the instance, executes a process of checking the attribute usage flag and attribute effectiveness flag data concerning the attributes that undergo the changes due to the addition of the function, and then determining at least one of whether the supervisory control target device supports a new function and whether supervisory control based upon the new function is effective for the attributes undergoing the changes due to the addition of the function.

19. A non-transitory computer readable medium having stored thereon a program for supervisory control conducted between a supervisory control target device for which attributes to be subjected to supervisory control are defined in association with an existing function of the supervisory control target device, and a supervisory control device retaining the supervisory control target attributes of the supervisory control target device as attributes of an instance associated with the supervisory control target device, wherein: in accordance with the supervisory control program applied to the supervisory control target device, a computer in which, when a function is added, an attribute usage flag that, as information assigned by the supervisory control device, indicates whether the supervisory control device supports any changes in the attributes due to addition of a function, and an attribute effectiveness flag that indicates whether the supervisory control target device supports the changes are added, as information relating to the attributes that undergo the changes, to a definition of the information concerning the attributes, executes a process of checking the attribute usage flag and attribute effectiveness flag data concerning the attributes that undergo the changes due to the addition of the function, and then determining at least one of whether the supervisory control device supports a new function and whether supervisory control based upon the new function is effective for the attributes undergoing the changes due to the addition of the function.

* * * * *